United States Patent
Kimizuka et al.

(10) Patent No.: US 8,758,151 B2
(45) Date of Patent: Jun. 24, 2014

(54) MEASURING METHOD OF GOLF CLUB HEAD

(71) Applicant: Dunlop Sports Co. Ltd., Kobe (JP)

(72) Inventors: Wataru Kimizuka, Kobe (JP); Masahide Onuki, Kobe (JP)

(73) Assignee: Dunlop Sports Co. Ltd., Kobe (JP)

( * ) Notice: Subject to any disclaimer, the term of this patent is extended or adjusted under 35 U.S.C. 154(b) by 0 days.

(21) Appl. No.: 13/730,156

(22) Filed: Dec. 28, 2012

(65) Prior Publication Data

US 2013/0172095 A1    Jul. 4, 2013

(30) Foreign Application Priority Data

Dec. 29, 2011    (JP) .................................. 2011-290416

(51) Int. Cl.
*A63B 69/36*    (2006.01)
*G06T 7/00*    (2006.01)
*G06T 7/20*    (2006.01)

(52) U.S. Cl.
CPC ........... *A63B 69/3658* (2013.01); *G06T 7/0042* (2013.01); *G06T 7/20* (2013.01); *G06T 2207/30204* (2013.01); *G06T 2207/10004* (2013.01); *G06T 2207/30224* (2013.01)
USPC ........................................ 473/222; 473/409

(58) Field of Classification Search
USPC ......... 473/131, 151, 156, 197, 219–223, 407, 473/409
See application file for complete search history.

(56) References Cited

U.S. PATENT DOCUMENTS

| | | | | |
|---|---|---|---|---|
| 4,713,686 A * | 12/1987 | Ozaki et al. | ................... | 348/157 |
| 5,342,054 A * | 8/1994 | Chang et al. | ................... | 473/156 |
| 6,602,144 B2 * | 8/2003 | Manwaring et al. | ........... | 473/198 |
| 6,669,571 B1 * | 12/2003 | Cameron et al. | .............. | 473/131 |
| 7,291,072 B2 * | 11/2007 | Bissonnette et al. | ........... | 473/198 |
| 7,311,611 B2 * | 12/2007 | Cameron et al. | .............. | 473/221 |
| 8,142,300 B2 * | 3/2012 | Iwatsubo et al. | .............. | 473/222 |
| 2002/0064764 A1 * | 5/2002 | Fishman et al. | ............... | 434/252 |
| 2003/0228070 A1 | 12/2003 | Miki et al. | | |
| 2005/0213076 A1 | 9/2005 | Saegusa | | |

FOREIGN PATENT DOCUMENTS

| | | |
|---|---|---|
| JP | 2004-24488 A | 1/2004 |
| JP | 2007-167549 A | 7/2007 |
| JP | 2011/130964 A | 7/2011 |
| KR | 10-2006-0043565 A | 5/2006 |

* cited by examiner

*Primary Examiner* — Nini Legesse
(74) *Attorney, Agent, or Firm* — Birch, Stewart, Kolasch & Birch, LLP

(57) ABSTRACT

A head measuring method of the present invention includes:
(a) preparing a golf club having a head having a plurality of markers provided thereon;
(b) photographing the head by a camera disposed at a position, wherein a backward distance between the position and a center point of a ball is equal to or greater than 0, to obtain a head image near an impact; and
(c) analyzing the head image to calculate a position and attitude of the head near the impact.

Preferably, three or more combinations of the markers set such that the marker interval is equal to or greater than a head vertical width exist.

15 Claims, 14 Drawing Sheets

MEASURING METHOD OF GOLF CLUB HEAD

The present application claims priority on Patent Application No. 2011-290416 filed in JAPAN on Dec. 29, 2011, the entire contents of which are hereby incorporated by reference.

BACKGROUND OF THE INVENTION

1. Field of the Invention

The present invention relates to a measuring method of a head during a golf swing.

2. Description of the Related Art

A position or attitude of a head during a swing is useful information. The information can be utilized for swing analysis and club fitting or the like. Particularly, a state of a head near an impact is closely connected with a hit ball result, and is important.

Japanese Patent Application Laid-Open No. 2004-24488 discloses an impact state measuring method using a camera set at a predetermined height in front of a ball set position along a ball flying direction.

Japanese Patent Application Laid-Open No. 2007-167549 discloses a golf club head behavior analysis device including at least two camera devices.

Japanese Patent Application Laid-Open No. 2004-61483 (US2003/0228070) discloses a measuring method for utilizing a plurality of two-dimensional images obtained by photographing a rotating curved surface body having a surface having a plurality of marks applied thereto, the photographing being done in a plurality of times, and a virtual curved surface body having a surface having a plurality of marks applied thereto, as in the curved surface body, to obtain a rotational amount and a rotation axis direction of the rotating curved surface body.

SUMMARY OF THE INVENTION

In a conventional technique, a head in an impact is photographed from the front side of a ball. A face surface in the impact can be photographed by photographing the head from the front side. The image of the face surface is effective in measuring the position and attitude of the head. The image from front side is effective in knowing a positional relationship between the ball and a face in the impact.

Apart of the head may be hidden with the ball in the image from the front side. Therefore, the marker applied to the head may be hidden with the ball. In this case, measurement accuracy may be reduced. It is preferable that the head can be more easily measured.

It is an object of the present invention to provide a measuring method capable of highly precisely and easily measuring an impact state of a head.

A head measuring method according to the present invention includes the steps of:

(a) preparing a golf club having a head having a plurality of markers provided on the head;

(b) photographing the head by a camera disposed at a position, wherein a backward distance between the position of the camera and a center point of a ball is equal to or greater than 0, to obtain a head image near an impact; and (c) analyzing the head image to calculate a position and attitude of the head near the impact.

A range near the impact and a camera position can be determined based on a ball position capable of being assumed when a ball is not used, for example, in a practice swing.

A three-dimensional distance between the markers is defined as a marker interval. Preferably, three or more combinations of the markers set such that the marker interval is equal to or greater than a head vertical width exist.

An area of a marker forming region defined by connecting the plurality of markers by a straight line in the head image is defined as Sm. An area of a whole region of the head defined by a contour line of the head in the head image is defined as Sh. At this time, preferably, Sm/Sh is equal to or greater than 0.25.

Preferably, the number N of the markers is 3 or greater and 20 or less.

When a centroid Gh of a contour line of the head is determined in the head image, and the head image is partitioned into four by a straight line L1 and a straight line L2 orthogonal to each other with the centroid Gh as an intersection point, preferably, at least one of the markers is disposed in each of the two partitions placed at diagonal positions, of the four partitions.

Preferably, the position and attitude of the head near the impact are calculated by analyzing the head image by the one camera in the step (c).

Preferably, the three or more markers are disposed outside a face surface.

The present invention can highly precisely and easily measure the impact state of the head.

DESCRIPTION OF THE PREFERRED EMBODIMENTS

Hereinafter, the present invention will be described in detail according to the preferred embodiments with appropriate references to the accompanying drawings.

Figure 1:
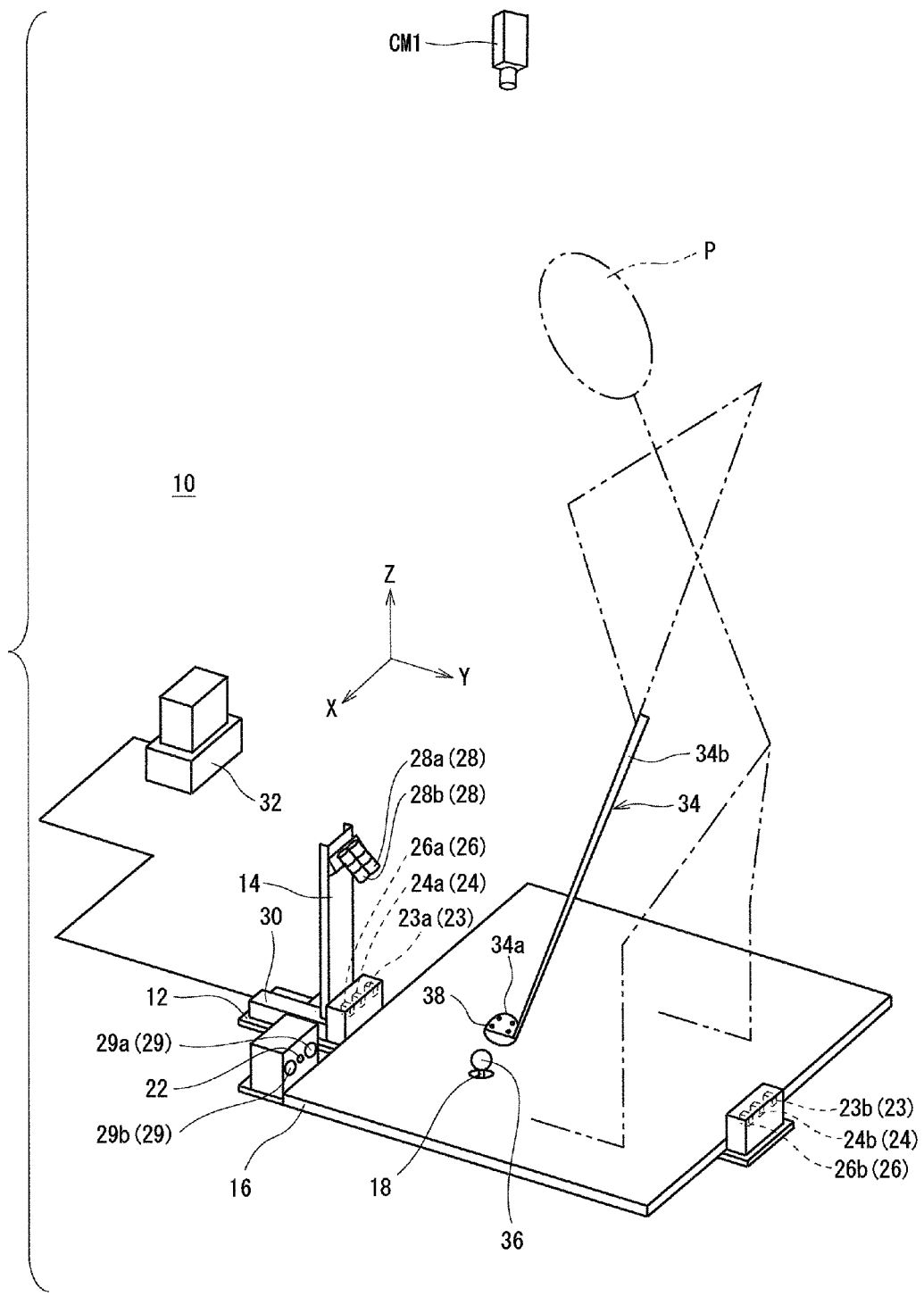
FIG. 1 is a perspective view showing an example of a measuring apparatus used for a measuring method of the present invention.

As shown in FIG. 1, a measuring apparatus 10 includes a base 12, a support rod 14, a base plate 16, a tee 18, a head camera CM1, a ball camera 22, a trigger sensor 23 (23a, 23b), a first sensor 24 (24a, 24b), a second sensor 26 (26a, 26b), a strobe light 28 (28a, 28b), a strobe light 29 (29a, 29b), a controller 30, and an information processor 32. Hereinafter, the head camera CM1 is also merely referred to as a camera.

A golf club 34 and a golf ball 36 are shown with the measuring apparatus 10 in FIG. 1. The golf club 34 includes a head 34a and a shaft 34b. An address attitude of a right-handed golf player P is shown by a two-dot chain line in FIG. 1. The golf ball 36 is launched toward the left direction of the player having the address attitude.

The support rod 14 and the base plate 16 are fixed to the base 12. The support rod 14 extends upward from the base 12. The tee 18 is positioned and mounted to the base plate 16. The camera CM1 is fixed to the upper side of the player P. The ball camera 22 is located in front of the tee 18, and is mounted to the side surface of the base plate 16. The camera CM1 is disposed so that the head near an impact can be photographed. Although not illustrated in the drawings, the camera CM1 is fixed to a ceiling, for example. The ball camera 22 is disposed so that the golf ball 36 immediately after the golf ball is hit can be photographed.

The trigger sensor 23 includes a light emitter 23a and a light receiver 23b. The light emitter 23a is disposed on one side surface of the base plate 16. The light receiver 23b is disposed on the other side surface of the base plate 16. The first sensor 24 includes a light emitter 24a and a light receiver 24b. The light emitter 24a is disposed on one side surface of the base plate 16. The light receiver 24b is disposed on the other side surface of the base plate 16. The second sensor 26 includes a light emitter 26a and a light receiver 26b. The light emitter 26a is disposed on one side surface of the base plate 16. The light receiver 26b is disposed on the other side surface of the base plate 16. The first sensor 24 is disposed at a position where the head 34a or the shaft 34b of the golf club 34 to be down-swung crosses between the light emitter 24a and the light receiver 24b. The second sensor 26 is disposed at a position where the head 34a or the shaft 34b crosses between the light emitter 26a and the light receiver 26b.

The strobe light 28 (28a, 28b) is mounted to the support rod 14. The controller 30 is mounted to the base 12.

The controller 30 is connected to the camera CM1, the ball camera 22, the trigger sensor 23, the first sensor 24, the second sensor 26, the strobe light 28, the strobe light 29, and the information processor 32. The controller 30 can receive a detection signal of the head 34a or the shaft 34b from the trigger sensor 23. The controller 30 can transmit a photographing start signal to the camera CM1 based on the detection signal from the trigger sensor 23. The controller 30 can transmit the photographing start signal to the ball camera 22. The controller 30 can receive an image signal photographed from the camera CM1 and the ball camera 22. The controller 30 can receive a detection signal of the head 34a or the shaft 34b from the sensors 24 and 26. The controller 30 can transmit a light emitting start signal to the strobe lights 28 and 29.

A shutter of the camera CM1 is opened for a predetermined time (for example, 1/30 second) based on the photographing start signal. While the shutter is opened, the head 34a or the shaft 34b crosses the sensors 24 and 26. When the sensor 24 is shielded, the strobe light 28a emits light. When the sensor 26 is shielded, the strobe light 28b emits light. Therefore, while the shutter is opened, the strobe light 28a and the strobe light 28b sequentially emit light. As a result, the head when the sensor 24 is shielded and the head when the sensor 26 is shielded are photographed on one image.

In the embodiment of FIG. 1, the head 34a is a wood type head. The head may not be a wood type head. Examples thereof include an iron type head, a utility type head, a hybrid type head, and a putter type head.

Although not shown in the drawings, the information processor 32 includes a monitor as an output part, an interface board as a data input part, a memory, a CPU, and a hard disk. The information processor 32 may include a keyboard and a mouse. A general-purpose computer may be used as it is as the information processor 32.

The hard disk stores programs. The memory, which is rewritable, includes a storing area and a working area for programs and various data called from the hard disk. The CPU can read the programs stored in the hard disk. The CPU can execute the programs in the working area of the memory. The CPU can execute various processes according to the programs. For example, the programs can calculate the position and attitude of the head based on a head image.

Head image data can be input into the interface board. The head image data, ball image data, and synchronous data of the two image data may be input. These input data are output to the CPU. The CPU executes various processes. The attitude and position of the head 34a can be calculated by the processes. Furthermore, a club behavior value and a ball behavior value may be calculated. Predetermined data of these calculated values is output to the monitor. The predetermined data is stored in the hard disk.

In the present application, a lateral direction (right-left direction) of the player P having the address attitude defined as a front-back direction. A flight direction of the ball is a front direction.

Figure 2:
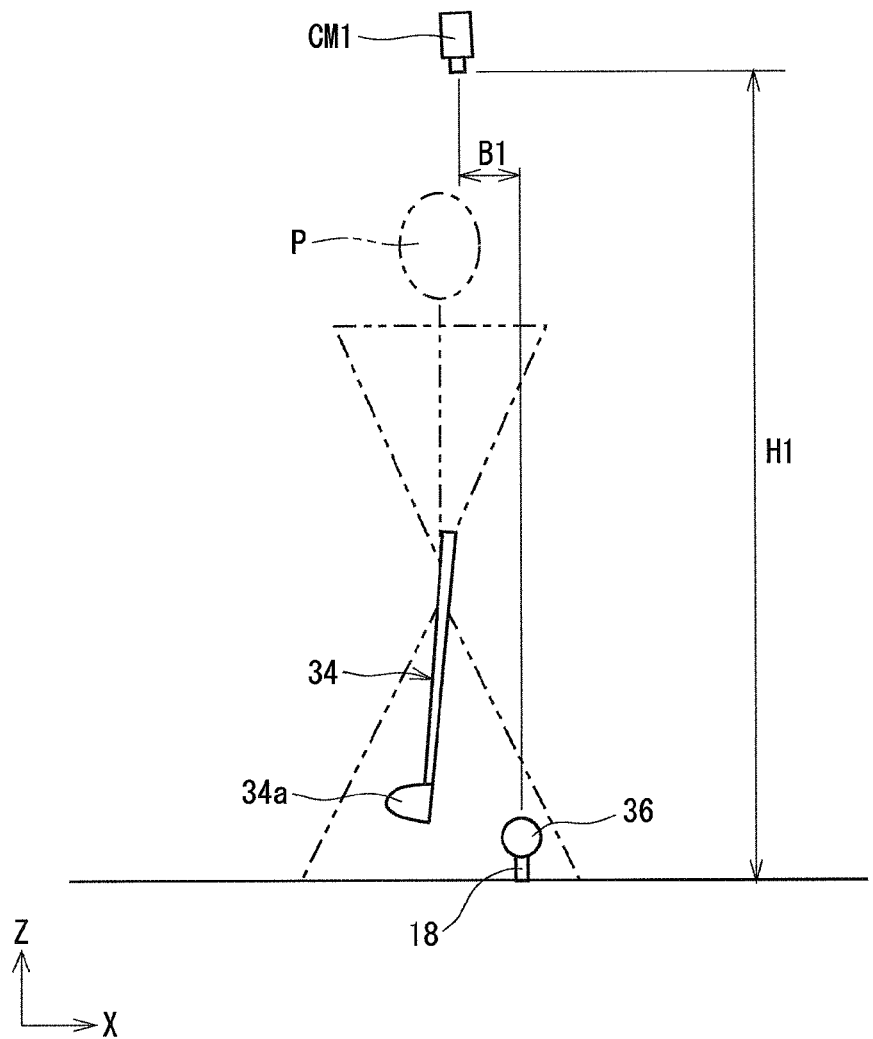
FIG. 2 is a front view showing a camera position in FIG. 1.

To facilitate the description, an X-axis, a Y-axis, and a Z-axis are defined in the present application (see FIGS. 1 and 2). The X-axis, the Y-axis, and the Z-axis are an orthogonal coordinate system. The X-axis is parallel to a ground, and is parallel to a straight line connecting the ball 36 before being hit and a target point. The Z-axis is a vertical direction. The Y-axis is perpendicular to the X-axis, and is perpendicular to the Z-axis. The front-back direction in the present application is an X-axis direction.

The measuring apparatus 10 can photograph the head image near the impact. The term "near an impact" includes an impact. The impact is in a state where the head 34a and the ball 36 are brought into contact with each other. The term "near an impact" means that a shortest distance between the head 34a and the center of the ball 36 is preferably equal to or less than 30 cm, and more preferably equal to or less than 20 cm. Preferably, the term "near an impact" means an impact and before the impact.

A marker 38 is provided on the head 34a. The marker 38 is a tape, for example. The marker 38 should be identified in the head image. A plurality of markers 38 are provided on the head 34a. In the embodiment of FIG. 1, four markers 38 are provided. In the embodiment, three or more markers 38 are provided outside a face surface. In the embodiment, all the markers 38 are provided outside the face surface. In the embodiment, all the markers 38 are provided on a crown of the head 34a. The golf ball 36 is set on the tee 18. The golf player P addresses the golf club 34.

In an example of a measuring method using the measuring apparatus 10, first, the golf player P starts to swing the golf club 34. The first sensor 24 detects the golf club 34 in a process of leading to the impact from a downswing. A detection signal of the first sensor 24 is output to the controller 30. The controller 30 outputs the light emitting start signal to the strobe light 28a at a time T1 after receiving the detection signal. The strobe light 28a receives the signal, and emits light. The controller 30 outputs the photographing start signal to the camera CM1 at a time T2 after receiving the detection signal.

Next, the second sensor 26 detects the golf club 34. A detection signal of the second sensor 26 is output to the controller 30. The controller 30 outputs the light emitting start signal to the strobe light 28b at a time T3 after receiving the detection signal. The strobe light 28b receives the signal, and emits light. The controller 30 outputs the photographing start signal to the camera CM1 at a time T4 after receiving the detection signal.

As described later, in the embodiment, the attitude and position of the head can be calculated by only one head image. In this case, the number of times of light emission of the strobe light may be 1. When a head orbit is calculated, the number of times of light emission of the strobe light is preferably a plural number in respect of obtaining a plurality of head images.

The camera CM1 photographs the head 34a near the impact. As described later, in the embodiment, the position and attitude of the head 34a can be calculated from one image.

The controller 30 outputs a light emitting signal to the strobe light 29a at a time T5. The controller 30 outputs the photographing start signal to the ball camera 22 at a time T6. The controller 30 outputs the light emitting signal to the strobe light 29b at a time T7, and outputs the photographing start signal to the ball camera 22 at a time T8.

The controller 30 outputs the head image data to the information processor 32. The controller 30 may output time data, head image data, and ball image data to the information processor 32.

The information processor 32 calculates the attitude and position of the club from the head image data. Examples of data near the impact (hereinafter, also referred to as impact data) capable of being calculated include the following data.

[Examples of Impact Data]
- a position of a head to a ball
- a hitting point on a face surface
- a lie angle
- a loft angle
- a face angle
- a head orbit (a blow angle and an approach angle or the like)

A head measuring method of the embodiment includes the following steps (a), (b), and (c):

(a) preparing a golf club 34 having a head 34a with a plurality of markers 38 provided thereon;

(b) photographing the head by a camera CM1 disposed at a position, wherein a backward distance between the position and a center point of a ball is equal to or greater than 0, to obtain a head image near an impact; and (c) analyzing the head image to calculate a position and attitude of the head 34a near the impact.

A preferred embodiment includes the following steps St1 to step St6:

step St1: the marker 38 on the head 34a of the golf club 34 is provided;

step St2: calibration of the camera CM1 is performed to determine a camera constant;

step St3: a golf player P swings and the head 34a near an impact is photographed one or more times to obtain one or more head images. The head 34a is photographed two or more times at different times to obtain two or more head images when the orbit of the head is obtained;

step St4: each of the markers 38 in the obtained head image is pointed. Each of the markers 38 can be automatically or manually pointed;

step St5: a computer calculates a three-dimensional position of each of the markers 38, and calculates the position and attitude or the like of the head 34a based on the three-dimensional positions; and step St6: the calculated result is output.

A backward distance between the center point of the ball and the camera CM1 is shown by a double-headed arrow B1 in FIG. 2. Preferably, the backward distance B1 is equal to or greater than 0. That is, the position of the camera CM1 in the X-axis direction is the same as the center point of the ball 36, or is in back of the center point of the ball 36. In the embodiment of FIG. 2, the position of the camera CM1 is in back of the center point of the ball 36. The hiding of the marker caused by the ball in the image near the impact is suppressed because of the position of the camera CM1. Therefore, measurement accuracy can be improved.

The position of the camera CM1 can be determined by a center point of a lens. The center point can be defined as a center point of a surface of the lens.

In respect of the measurement accuracy, more preferably, the backward distance B1 is equal to or greater than 0. That is, more preferably, the camera CM1 is located rearward from the center of the ball 36 by the distance B1. The embodiment of FIG. 2 shows a more preferable mode.

Figure 3:
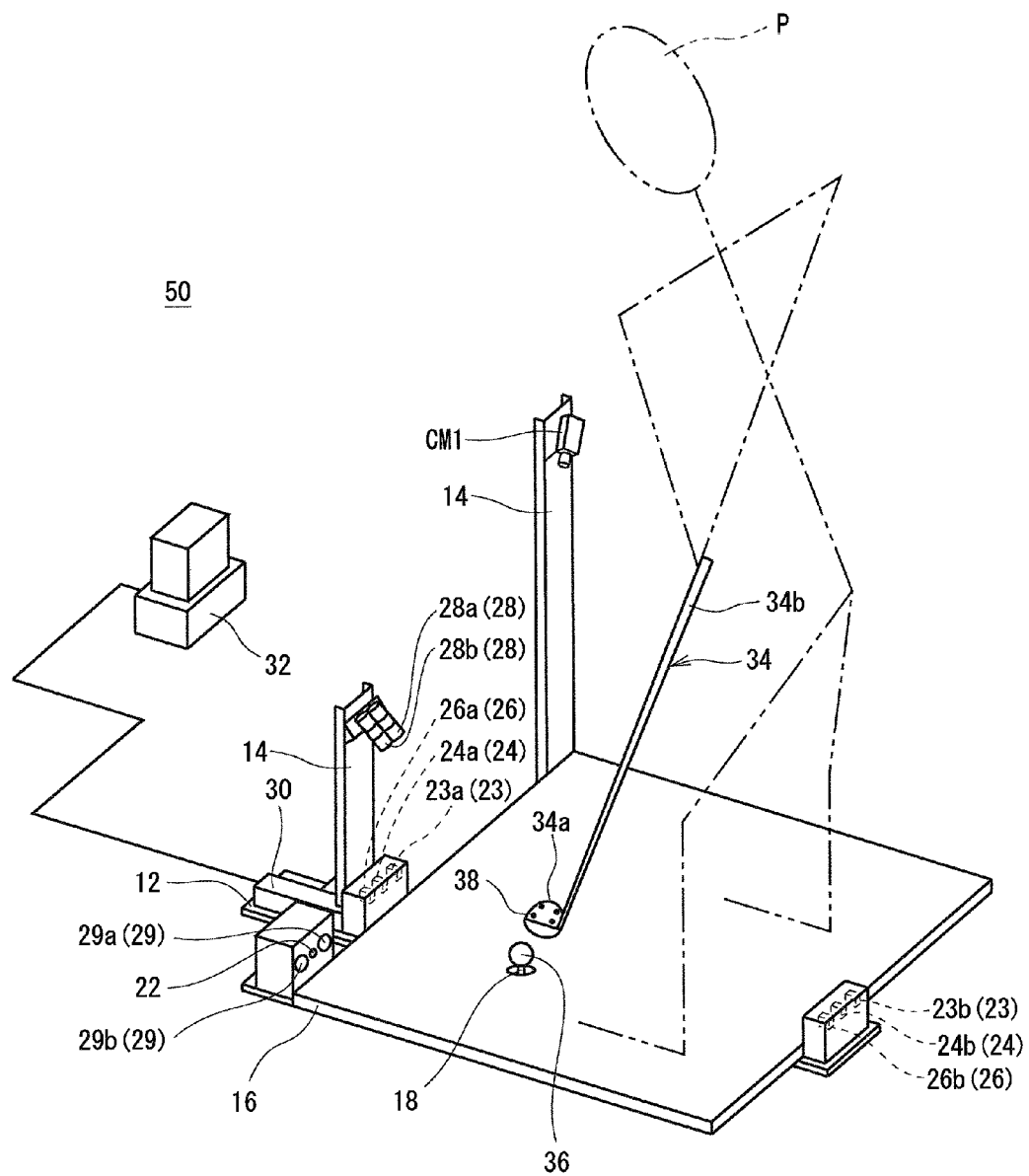
FIG. 3 is a perspective view showing another example of the measuring apparatus used for the measuring method of the present invention.

FIG. 3 shows a measuring apparatus 50 of a second embodiment. Except for the position of the camera CM1, the measuring apparatus 50 is the same as the measuring apparatus 10.

Figure 4:
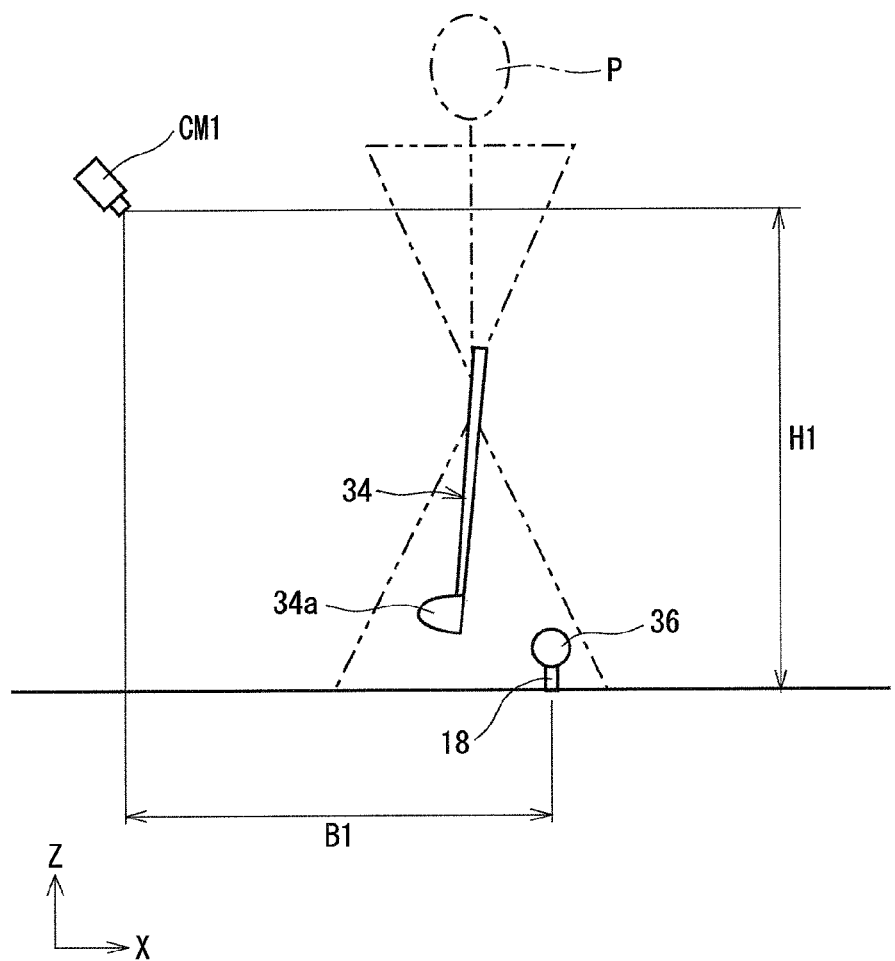
FIG. 4 is a front view showing a camera position in FIG. 3.
Figure 5:
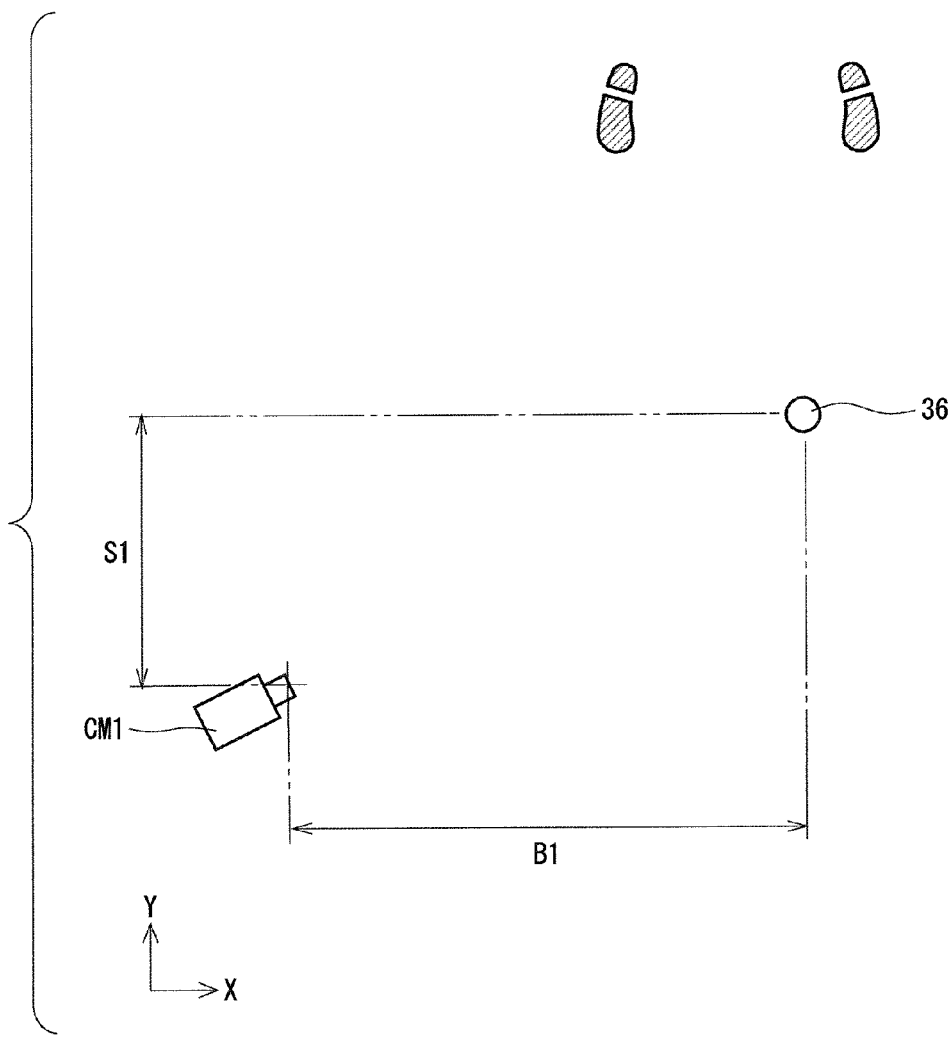
FIG. 5 is a plan view showing the camera position in FIG. 3.

FIGS. 4 and 5 show the position of the camera CM1 in the measuring apparatus 50. FIG. 4 shows the camera CM1 viewed from the front of the player P. FIG. 5 shows the camera CM1 viewed from above. The backward distance B1 in the embodiment of FIG. 4 is greater than that in the embodiment of FIG. 2. Therefore, the influence of the ball 36 on the head image can be further reduced. This can contribute to improvement in the measurement accuracy.

In respect of eliminating the influence of the ball on the head image, the backward distance B1 is preferably equal to or greater than 0, more preferably greater than 0, still more preferably equal to or greater than 3 cm, and yet still more preferably equal to or greater than 5 cm. In respect of obtaining a distinct image, the backward distance B1 is preferably equal to or less than 200 cm, and more preferably equal to or less than 30 cm. In the present first embodiment, the backward distance B1 is 8 cm.

A height of the camera CM1 from the ground is shown by a double-headed arrow H1 in FIGS. 2 and 4. In order to obtain a distinct head image, an excessive height H1 is not preferable. In this respect, the height H1 is preferably equal to or less than 300 cm, more preferably equal to or less than 250 cm, and still more preferably equal to or less than 200 cm. The height H1 is measured along the Z-axis direction (vertical direction).

The position of the camera CM1 in the Y-axis direction is preferably a position where the head image near the impact is not hidden by the player P. Herein, a Y coordinate (distance S1 of FIG. 5) on the front side (in front of the player P) of the center of the ball 36 is defined as minus. A Y coordinate on the back side (in back of the player P) of the center of the ball 36 is defined as plus. In respect of suppressing the influence of the image of the player P on the head image, the Y coordinate of the position of the camera CM1 is preferably −200 cm to +200 cm, more preferably −100 cm to +100 cm, and still more preferably −50 cm or greater and 0 cm or less. The Y coordinate of the center of the ball 36 is set to 0.

[Head Vertical Width of Wood Type Head]

Figure 6:
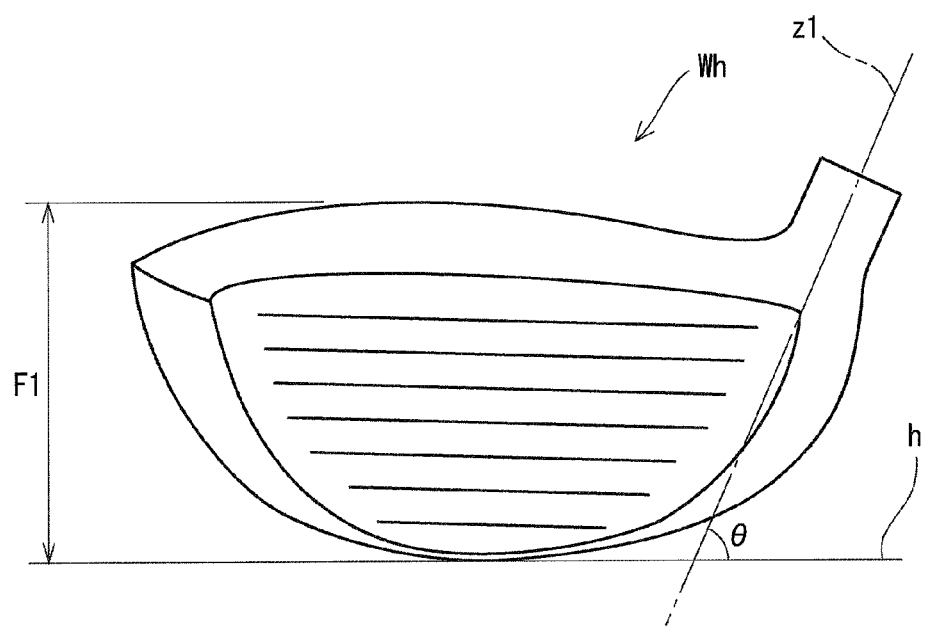
FIG. 6 is a front view showing a head vertical width of a wood type head.

A head vertical width F1 is defined in the present application. FIG. 6 shows a head vertical width F1 of a wood type head Wh. In the measurement of the head vertical width F1, a plane HP (not shown) perpendicular to a level surface h is considered. The head Wh is placed on the level surface h, and a shaft axis line z1 is disposed in the perpendicular plane HP. Furthermore, an angle θ between the shaft axis line and the level surface h is set to 60 degrees. In this state, a height from the level surface h to the uppermost part of the crown is the head vertical width F1. The head vertical width F1 is measured along a direction perpendicular to the level surface h.

[Head Vertical Width of Iron Type Head]

Figure 7:
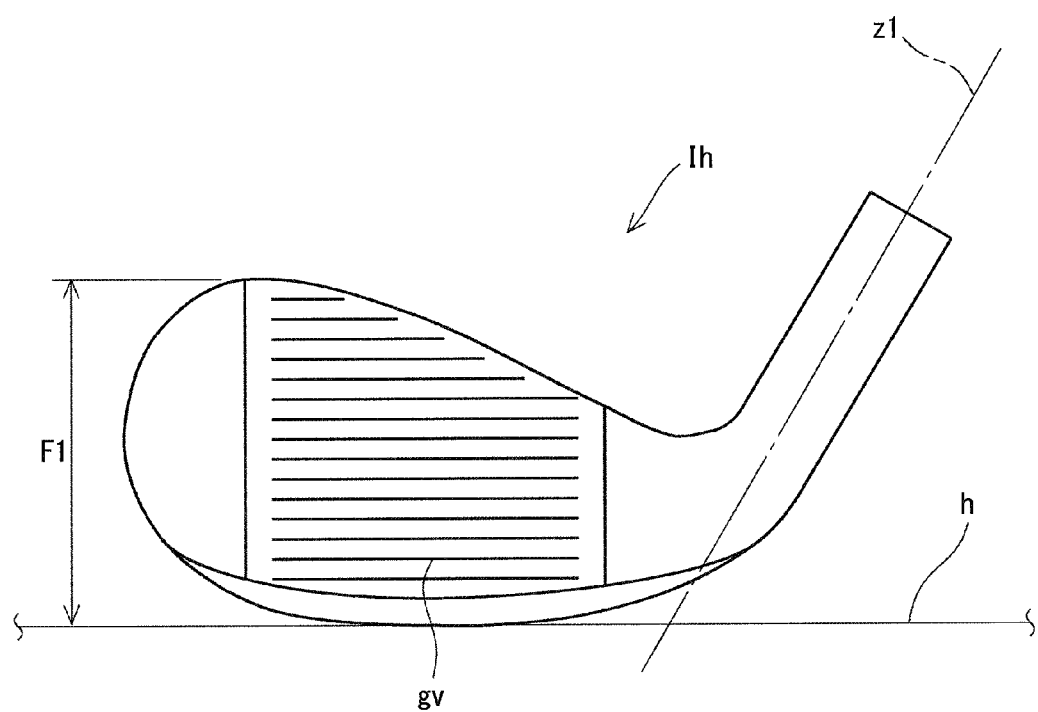
FIG. 7 is a front view showing a head vertical width of an iron type head.

FIG. 7 shows a head vertical width F1 of an iron type head Ih. In the measurement of the head vertical width F1, a plane HP (not shown) perpendicular to the level surface h is considered. The head Ih is placed on the level surface h, and a shaft axis line z1 is disposed in the perpendicular plane HP. Furthermore, a face line gv is made parallel to the level surface h. In this state, a height from the level surface h to a blade uppermost part is the head vertical width F1. The head vertical width F1 is measured along a direction perpendicular to the level surface h.

In a head having a crown such as a utility type head and a hybrid type head, the reference of the wood type head can be employed for the head vertical width F1. The reference of the iron type head can be employed for the head vertical width F1 of a head having no crown.

Figure 8A:
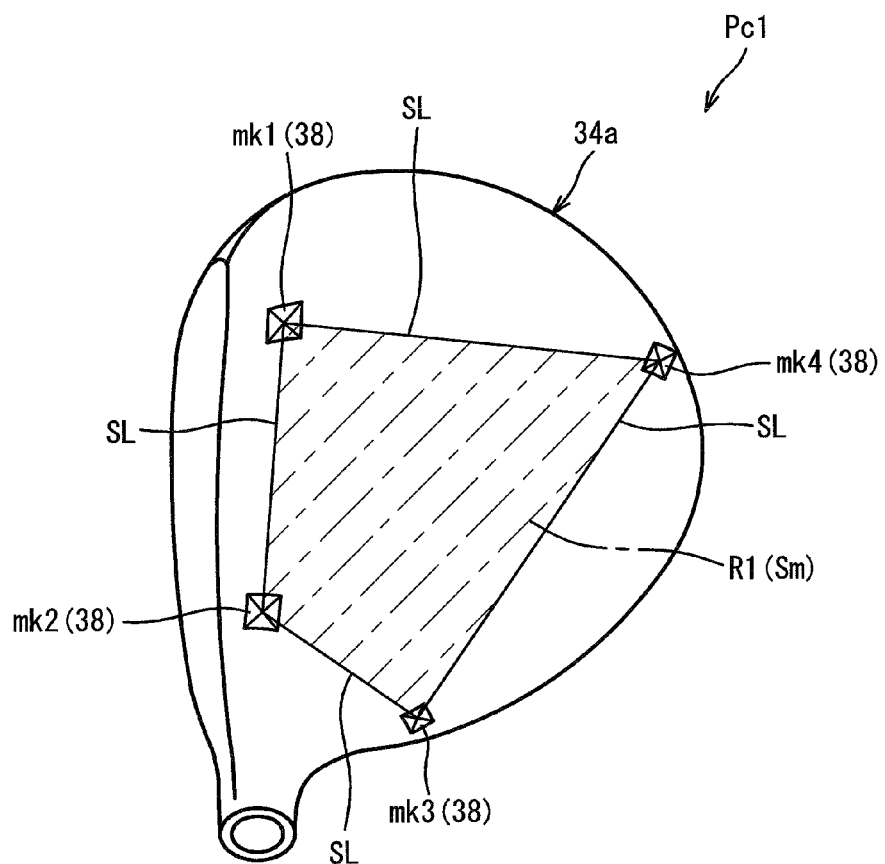
FIG. 8A shows an example of a head image with a marker forming region and FIG. 8B shows a marker interval.
Figure 8B:
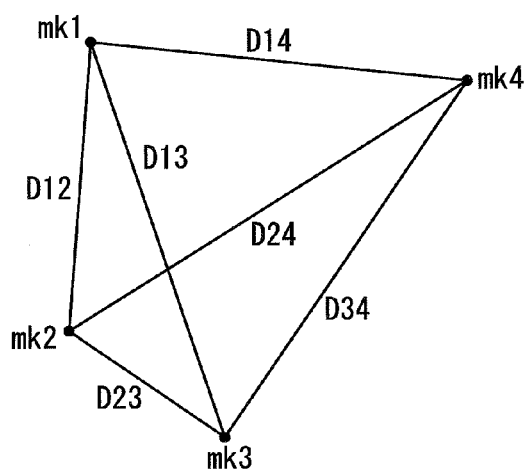
Figure 9:
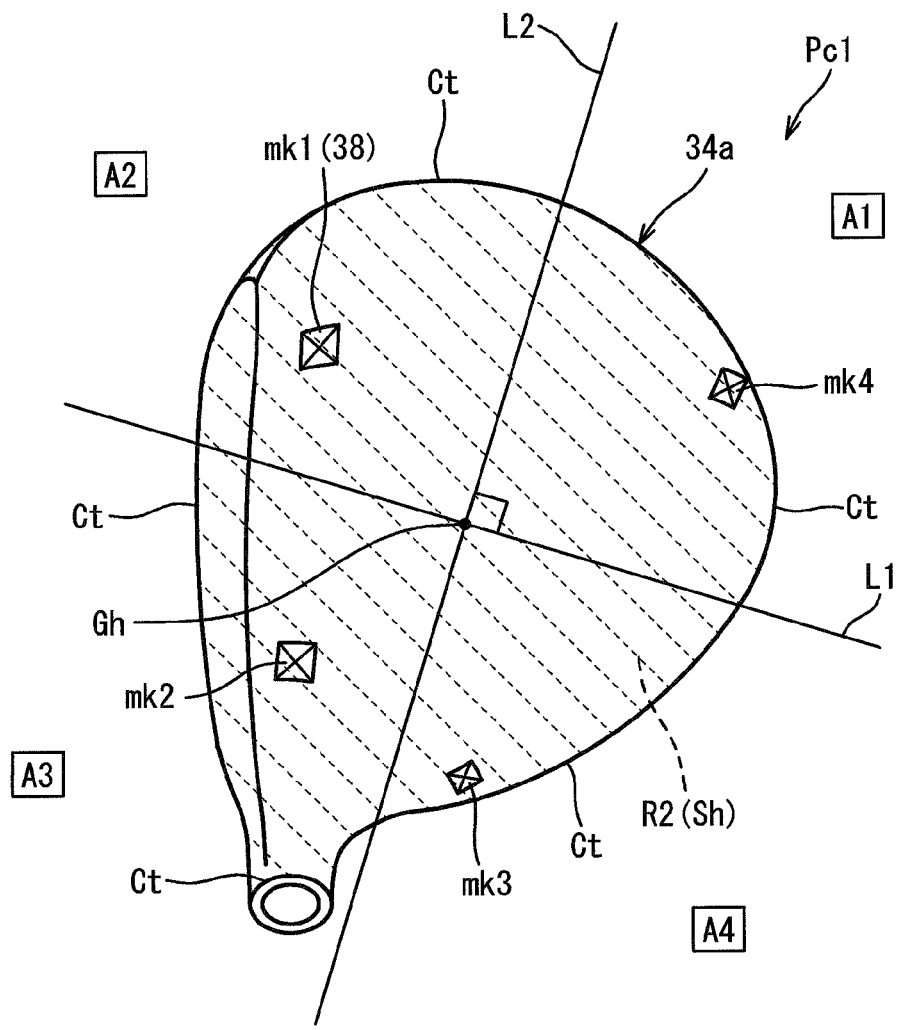
FIG. 9 shows an example of a head image, and shows a whole area of a head.

FIGS. 8A and 9 show an example of a head image Pc1 near the impact. In FIG. 8, only the head is drawn with the description of the shaft or the like omitted. The head image Pc1 is photographed by the measuring apparatus 10.

In the embodiment, a marker mk1, a marker mk2, a marker mk3, and a marker mk4 are used as the four markers 38. All the markers mk1 to mk4 are disposed on the crown of the head 34a. These markers 38 are white square tapes on which diagonal lines are drawn. For example, an intersection point between the diagonal lines is the position of the marker 38. The centroid of the marker 38 may be the position of the marker 38. The measurement accuracy can be further improved by defining the position of the marker 38 in detail.

[Marker Interval]

In the present application, a three-dimensional distance between the markers is defined as a marker interval. That is, an actual distance between the markers is the marker interval. The marker interval can be determined in all the combinations of the markers. For example, when the number of the markers is 4, six marker intervals exist.

FIG. 8B shows the marker interval in the head of FIG. 8A. All the combinations are considered in the determination of the marker interval. Since the number of the markers 38 is 4 in the head, six marker intervals exist. That is, in the head 34a, a marker interval D12, a marker interval D13, a marker interval D14, a marker interval D23, a marker interval D24, and a marker interval D34 exist. The marker interval D12 is a distance between the marker mk1 and the marker mk2. The marker interval D13 is a distance between the marker mk1 and the marker mk3. The marker interval D14 is a distance between the marker mk1 and the marker mk4. The marker interval D23 is a distance between the marker mk2 and the marker mk3. The marker interval D24 is a distance between the marker mk2 and the marker mk4. The marker interval D34 is a distance between the marker mk3 and the marker mk4.

[Number Cn of Combinations]

The number of combinations of the markers set such that the marker interval is equal to or greater than the head vertical width F1 is defined as Cn. In respect of the measurement accuracy, preferably, the number Cn of combinations is preferably equal to or greater than 3, and more preferably equal to or greater than 4. In respect of avoiding excessively complicated calculation, the number Cn of combinations is preferably equal to or less than 190, and more preferably equal to or less than 45.

[Marker Forming Region R1, Area Sm]

A marker forming region R1 is defined in the head image Pc1 (see FIG. 8). The marker forming region R1 is shown by dashed-dotted line hatching in FIG. 8. The marker forming region R1 is defined by connecting the plurality of marker mk1 to mk4 with a straight line SL in the head image Pc1. When the number of the markers 38 is N, the marker forming region R1 is an N-polygon. The area of the marker forming region R1 is defined as Sm. The area Sm is an area in the head image Pc1 (two-dimensional image).

[Whole Region R2 of Head, Area Sh]

Furthermore, a whole region R2 of the head is defined in the head image Pc1 (see FIG. 9). The whole region R2 of the head is shown by dashed line hatching in FIG. 9. The whole region R2 of the head is defined by a contour line Ct of the head 34a in the head image Pc1. A portion hidden by the shaft and a ferrule does not constitute the contour line Ct of the head 34a. That is, the contour line Ct is a line existing in the head image Pc1. An area of the whole region R2 of head is defined as Sh. The area Sh is also an area in the head image Pc1 (two-dimensional image).

[Sm/Sh]

In respect of enhancing the measurement accuracy, Sm/Sh is preferably equal to or greater than 0.25, more preferably equal to or greater than 0.5, and still more preferably equal to or greater than 0.75. Sm/Sh may be 1. However, when a head shape or the like is considered, Sm/Sh is usually equal to or les than 0.8.

[Number N of Markers]

The number N of the markers 38 is set to a plural number. In respect of the measurement accuracy, the number N of the markers 38 is preferably equal to or greater than 3, and more preferably equal to or greater than 4. When the number N is excessive, calculation becomes complicated. In this respect, the number N is preferably equal to or less than 20, and more preferably equal to or less than 10. In the embodiment of FIGS. 8 and 9, the number N is 4.

Even when the number N of the markers is small, highly accurate measurement is enabled by increasing Sm/Sh. Even when the backward distance B1 is equal to or greater than 0, highly accurate measurement is enabled by increasing Sm/Sh.

[Centroid Gh, Straight Line L1, Straight Line L2]

In the head image Pc1, a centroid Gh of the contour line Ct of the head 34a is determined. A straight line L1 and a straight line L2 orthogonal to each other with the centroid Gh as an intersection point are determined. The straight line L1 and the straight line L2 are optional straight lines. That is, as long as the straight line L1 and the straight line L2 pass through the centroid Gh and are orthogonal to each other, the straight line L1 and the straight line L2 may be any straight line. The straight line L1 and the straight line L2 can be innumerably determined. The straight line L1 and the straight line L2 shown in FIG. 9 are illustrative.

[Partition by Straight Line L1 and Straight Line L2]

As shown in FIG. 9, the head image Pc1 is partitioned into four by the straight line L1 and the straight line L2. In the embodiment, the head image Pc1 is partitioned into a first partition A1, a second partition A2, a third partition A3, and a fourth partition A4. In the embodiment, the marker mk4 is located in the first partition A1; the marker mk1 is located in the second partition A2; the marker mk2 is located in the third partition A3; and the marker mk3 is located in the fourth partition A4.

[Diagonal Position]

As shown in FIG. 9, the marker mk4 and the marker mk2 are respectively disposed in the two partitions A1 and A3 located at diagonal positions, of the four partitions. Furthermore, the marker mk1 and the marker mk3 are respectively disposed in the two partitions A2 and A4 located at diagonal positions, of the four partitions. The markers 38 are dispersed by the disposal, and thereby the measurement accuracy can be improved. In the embodiment, at least one marker 38 is disposed in each of the four partitions A1, A2, A3, and A4. Therefore, the measurement accuracy can be further improved.

A measurement error may be caused by the number of pixels of the head image and the deviation of pointing. A ratio of a deviation amount to an interval between the markers 38 is decreased by increasing the interval between the markers 38. Therefore, the error can be decreased in the calculation in the step (c).

In the embodiment, in the step (c), the position and attitude of the head near the impact are calculated by analyzing only one head image Pc1. Therefore, the plurality of head images may not be acquired. The number of the cameras CM1 may be 1. Therefore, the measurement, the calculation, and the device are simplified. The convenience of the measurement is improved by the simplification, and the cost of the device can be also lowered.

In the embodiment, the head 34a is a wood type head. The head 34a has a crown. The crown is comparatively large. A distance between the markers 38 can be increased by providing the marker 38 on the crown. The provision of the marker 38 on the crown is advantageous to increase Sm/Sh.

In the embodiment, the three or more markers are disposed outside the face surface. Therefore, a situation where the markers 38 are hidden by the ball 36 to uncalculate the head attitude is not caused. In this case, the number Cn of combinations is apt to be increased. Therefore, the measurement accuracy can be improved.

When the head has the crown, all the plurality of markers 38 may be disposed on the crown. In this case, the markers 38 are not hidden by the ball 36. Therefore, an effect obtained by setting the backward distance B1 to be equal to or greater than 0 can be further improved. Since the crown is comparatively large, the number Cn of combinations is likely to be increased. Therefore, the measurement accuracy can be improved.

When the backward distance B1 is equal to or greater than 0, the face surface may not be photographed in the head image. Even when the face surface is not photographed in the head image, the embodiment enables the measurement.

In the step (c), preferably, the position and attitude of the head 34a are calculated based on the position of the marker 38 in the head image Pc1. Preferably, the calculating method can calculate the position and attitude of the head 34a from one head image.

In the preferred step (c), the three-dimensional coordinates of the plurality of markers 38 are calculated from the head image Pc1. A DLT method is known as an example of the calculating method. DLT stands for "Direct Linear Transformation".

The DLT method is a method for obtaining three-dimensional space coordinates using a plurality of images viewed from a different direction. In the DLT method, the three-dimensional coordinates are reconstructed based on images of points (control points) having known three-dimensional coordinates. The DLT method has little restraint in the disposal of the camera, and has high versatility.

Figure 14:
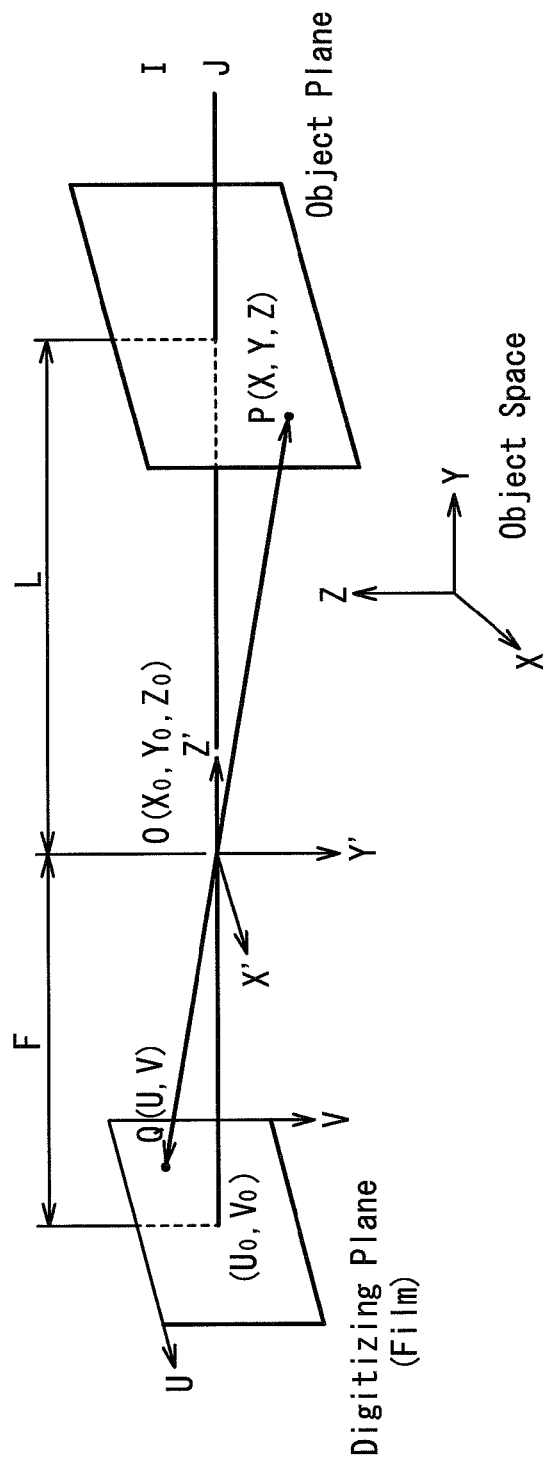
FIG. 14 describes a DLT method.

The DLT method will be described by the following numerical expression and FIG. 14. FIG. 14 shows a relationship between object space coordinates and coordinates on a digitizing plane.

A relationship between a coordinate (X, Y, Z) in the object space and a coordinate (U, V) on the digitizing plane when a point P in the object space is photographed with a camera is shown in FIG. 14. Herein, a point O is a lens center point of the camera, and a coordinate system X'Y'Z' has an X'-axis and a Y'-axis parallel to those of a coordinate system UV on the digitizing plane with the point O as an origin. Symbol L designates a distance between the point O and a point P on a Z' axis. Symbol F designates a distance between the point O and a point Q (mapping of the point P) on the Z' axis. A point $(U_0, V_0)$ is an intersection point between a straight line including the Z' axis and the digitizing plane. In this case, the following description and numerical expression are realized.

[Expression 1]

When $\overrightarrow{OP}$ and $\overrightarrow{OQ}$ are written as a component of a coordinate system X'Y'Z', $\overrightarrow{OP}$ and $\overrightarrow{OQ}$ are as follows. M represents a 3×3 rotation matrix to the coordinate system X'Y'Z' from a coordinate system XYZ.

$$\overrightarrow{OP} = M \cdot \begin{bmatrix} X - X_0 \\ Y - Y_0 \\ Z - Z_0 \end{bmatrix}, \overrightarrow{OQ} = \begin{bmatrix} U - U_0 \\ V - V_0 \\ -F \end{bmatrix}$$

A relationship of $\overrightarrow{OQ} = -F/L \cdot \overrightarrow{OP}$ exists between $\overrightarrow{OP}$ and $\overrightarrow{OQ}$. When the formula is written for every component, and L is eliminated using a formula of a Z' component, the following two formulae are formed. $m_{ij}$ represents a component of i row and j column of M.

$$U = U_0 - F \frac{m_{11}(X - X_0) + m_{12}(Y - Y_0) + m_{13}(Z - Z_0)}{m_{31}(X - X_0) + m_{32}(Y - Y_0) + m_{33}(Z - Z_0)}$$

$$V = V_0 - F \frac{m_{21}(X - X_0) + m_{22}(Y - Y_0) + m_{23}(Z - Z_0)}{m_{31}(X - X_0) + m_{32}(Y - Y_0) + m_{33}(Z - Z_0)}$$

When constants determined by a physical relationship between a lens and a film in the formulae are summarized and organized, the following two formulae (formula F1) are formed. The constants $A_1$ to $A_4$, $B_1$ to $B_4$, and $C_1$ to $C_3$ are referred to as a camera constant.

$$U = \frac{A_1 X + A_2 Y + A_3 Z + A_4}{C_1 X + C_2 Y + C_3 Z + 1} \quad (F1)$$

$$V = \frac{B_1 X + B_2 Y + B_3 Z + B_4}{C_1 X + C_2 Y + C_3 Z + 1}$$

In order to obtain the 11 camera constants, six or more points having known object space coordinates (X, Y, Z) and coordinates (U, V) on the digitizing plane are photographed with the camera. The coordinates (X, Y, Z) and (U, V) of each of the points are substituted into the formula to form a total of 12 or more formulae. The 11 camera constants are obtained by a least-square method. An operation for obtaining the camera constant is referred to as calibration. When the 11 camera constants are obtained, the coordinate (U, V) on the digitizing plane of the point having the known object space coordinate (X, Y, Z) can be obtained. On the contrary, in order to obtain the object space coordinate (X, Y, Z) from the coordinate (U, V) on the digitizing plane, four or more equations are formed by photographing the same point using two or more cameras having the known camera constant and substituting the obtained $(U_1, V_1)$ $(U_2, V_2)$ . . . into the formula, and (X, Y, Z) are obtained by the least-square method. Such a method is referred to as a DLT method.

In the method, two cameras are required in order to obtain a coordinate of one independent point on the space. The coordinate of the point cannot be obtained from one camera. However, when a physical relationship (that is, coordinates of points in an object coordinate system) between the points is known, the relational expression is added to an equation for obtaining a space coordinate (X, Y, Z), and thereby coordinates (that is, the position and attitude of the object) of a plurality of points fixed to an object having a size can be obtained. The coordinate of each of the points (markers) in the object coordinate system (head coordinate system) is obtained by the three-dimensional shape measurement or the like of the object (head), for example. It is an object of the embodiment to obtain the position and attitude of the club head. Therefore, hereinafter, a case where the space coordinate (X, Y, Z) of a representative point of the object and the attitude ($\alpha, \beta, \gamma$) of the object are solved as unknowns will be described.

[Expression 2]

When the formula F1 is deformed, the following two formulae F2 are formed.

$$(A_1 - C_1 u)x + (A_2 - C_2 u)y + (A_3 - C_3 u)z + (A_4 - u) = 0$$

$$(B_1 - C_1 v)x + (B_2 - C_2 v)y + (B_3 - C_3 v)z + (B_4 - v) = 0 \quad (F2)$$

Herein, a space coordinate of each of points on an object can be represented as $\vec{R}_{i=1, 2, \ldots n-1} = (X, Y, Z)^T + T \cdot \vec{r}_{i=1, 2, \ldots n-1}$ using a vector $\vec{r}_{i=1, 2, \ldots n-1}$ (known) to each of N points from a representative point in an object coordinate system. T is a coordinate conversion matrix to the object coordinate system from a space coordinate system, and is a known function of $\alpha, \beta, \gamma$. That is, $\vec{R}_{i=1, 2, \ldots n-1}$ is a function of a space coordinate (X, Y, Z) of a representative point of the object and an attitude ($\alpha, \beta, \gamma$) of the object.

When $\vec{R}_{i=1, 2, \ldots n-1}$ and a coordinate $(U_{i=1, 2, \ldots n-1}, V_{i=1, 2, \ldots n-1})$ on a digitizing plane of each of the points are substituted into the formula F2, 2n nonlinear simultaneous equations (F3) can be formed as follows.

$$(A_1 - C_1 U)X + (A_2 - C_2 U)Y + (A_3 - C_3 U)Z + (A_4 - U) = 0$$

$$(B_1 - C_1 V)X + (B_2 - C_2 V)Y + (B_3 - C_3 V)Z + (B_4 - V) = 0$$

$$(A_1 - C_1 U_1)R_1(x) + (A_2 - C_2 U_1)R_1(y) +$$
$$(A_3 - C_3 U_1)R_1(z) + (A_4 - U_1) = 0$$

$$(B_1 - C_1 V_1)R_1(x) + (B_2 - C_2 V_1)R_1(y) + (B_3 - C_3 V_1)R_1(z) + (B_4 - V_1) = 0$$

$$(A_1 - C_1 U_2)R_2(x) + (A_2 - C_2 U_2)R_2(y) +$$
$$(A_3 - C_3 U_2)R_2(z) + (A_4 - U_2) = 0$$

$$(B_1 - C_1 V_2)R_2(x) + (B_2 - C_2 V_2)R_2(y) + (B_3 - C_3 V_2)R_2(z) + (B_4 - V_2) = 0$$

$$\vdots$$

$$(A_1 - C_1 U_{n-1})R_{n-1}(x) + (A_2 - C_2 U_{n-1})R_{n-1}(y) +$$
$$(A_3 - C_3 U_{n-1})R_{n-1}(z) + (A_4 - U_{n-1}) = 0$$

$$(B_1 - C_1 V_{n-1})R_{n-1}(x) + (B_2 - C_2 V_{n-1})R_{n-1}(y) +$$
$$(B_3 - C_3 V_{n-1})R_{n-1}(z) + (B_4 - V_{n-1}) = 0$$

In the formula (F3), $R_i(x)$ represents an x component of $R_i$; $R_i(y)$ represents a y component of $R_i$; and $R_i(z)$ represents a z component of $R_i$.

A simultaneous equation (F3) in which the number of unknowns is six and the number of formulae is 2n can be solved by a Newton-Raphson method (a solving method of a nonlinear simultaneous equation). Thereby, the position of the six unknowns, that is, the representative point of the object, and the attitude of the object can be obtained. $\alpha, \beta, \gamma$ show a coordinate conversion angle to the object coordinate system from a space coordinate system. In the embodiment, when a coordinate system Cs1 is obtained by rotating a space coordinate system XYZ by $\alpha$ degrees around the Z-axis, a coordinate system Cs2 is obtained by rotating the coordinate system Cs1 by $\beta$ degrees around the Y-axis, and a coordinate system Cs3 is obtained by rotating the coordinate system Cs2 by $\gamma$ degrees around the X-axis, the coordinate system Cs3 coincides with the object coordinate system.

The 2n simultaneous equations are defined as the formula (F3). A method for solving the formula (F3) by means of the Newton-Raphson method will be shown below.

[Expression 3]

When $x = (X, Y, Z, \alpha, \beta, \gamma)^T$ is set, the formula (F3) can be represented as $y = f(x) = 0$ . . . (F4). Herein, $x \in R^6$, $y \in R^{2n}$ and $f \in R^{2n}$ are set.

Now, solutions $x_s$, $y_s$ ($=0$) satisfying the formula (F4) exist. At this time, x is changed by $x_s \rightarrow x_s + \delta_x$, and y is changed by $y_s \rightarrow y_s + \delta_y$ because of this. $\delta_x$, $\delta_y$ are sufficiently small values.

In this time, the formula (F4) is $y_s + \delta_y = f(x_s + \delta_x)$. When the right member is Taylor-expanded around $x_s$ and a minute amount of second or more order is ignored, a formula $$y_s + \delta_y = f(x_s) + \frac{\partial f(x_s)}{\partial x} \delta_x \Leftrightarrow \delta_y = \frac{\partial f(x_s)}{\partial x} \delta_x \quad (F5)$$

is obtained.

Herein, the formula (F5) is a form obtained by differentiating a vector with a vector. Correctly, the formula (F5) is represented as J, and a formula $$J(x_s) = \frac{\partial f(x_s)}{\partial x}$$

$$= \left( \frac{\partial f(x)}{\partial X}, \frac{\partial f(x)}{\partial Y}, \frac{\partial f(x)}{\partial Z}, \frac{\partial f(x)}{\partial \alpha}, \frac{\partial f(x)}{\partial \beta}, \frac{\partial f(x)}{\partial \gamma} \right)_{x=x_s}$$

is formed.

J is referred to as a Jacobian matrix, and represents a relationship between an input change $\delta x$ and an output change $\delta y$ in x.

Now, a suitable initial value $x_0 \neq x_s$ is set for x. At this time, y is defined as $y_0 = f(x_0) \neq y_s$. At this time, $Y_0 - y_s = J(x_0)(x_0 - x_s)$ is realized form the relationship of the formula (F5). Thereby, $X_0 - X_s = J(X_0)^\#(y_0 - y_s)$ . . . (F6) is formed. Herein, $J^\# = J^T (JJ^T)^{-1}$ is a pseudo inverse matrix of J.

When $x_1 = x_0 - J(x_0)^\#(y_0 - y_s)$ is set from the formula (F6), $x_1 = s_s$ should be formed. However, since $J(x_0)$ is a moment value of $x = x_0$, a minute amount $\delta$ is set in fact, and $x_1$ is brought close to $x_s$ from $x_0$ as $x_1=x_0-\delta J(x_0)^\#(y_0-y_s)$. Then, $x_i$ is brought close to $x_s$ by repeatedly performing calculation as $x_{i+1}=x_i-\delta J(x_i)^\#(y_i-y_s)$.

In the method, the formula (F6) is solved with an initial value $x_0$ of $x$ set and $y_s=0$ formed, and thereby a numerical solution of $x=(X, Y, Z, \alpha, \beta, \gamma)^T$ satisfying the formula (F3) can be obtained.

The method is an example of a so-called gradient method. Since the calculation of the gradient method is simpler than that of a genetic algorithm used in Japanese Patent Application Laid-Open No. 2004-61483, the gradient method is effective when a calculation result is desired to be displayed in real time, for example. For example, there is a need for desiring to display the calculation result in real time in fitting in the shop, and showing the calculation result to a customer at the scene. The simple calculation method is suitable for displaying the result in real time.

Thus, the space coordinate of the representative point and the three-dimensional attitude of the head can be calculated from one head image based on the relative relationship between the points having known coordinates in the object coordinate system.

EXAMPLES

Hereinafter, the effects of the present invention will be clarified by examples. However, the present invention should not be interpreted in a limited way based on the description of the examples.

[Test by Wood Type Head]

Example 1

A wood type golf club head was prepared. Ahead of a number 1 wood (driver head) was used. A plurality of markers were stuck on a crown of the head. Each of the markers had a substantially square shape. White markers were used. Diagonal lines were drawn on each of the markers. An intersection point between the diagonal lines was pointed.

Figure 10:
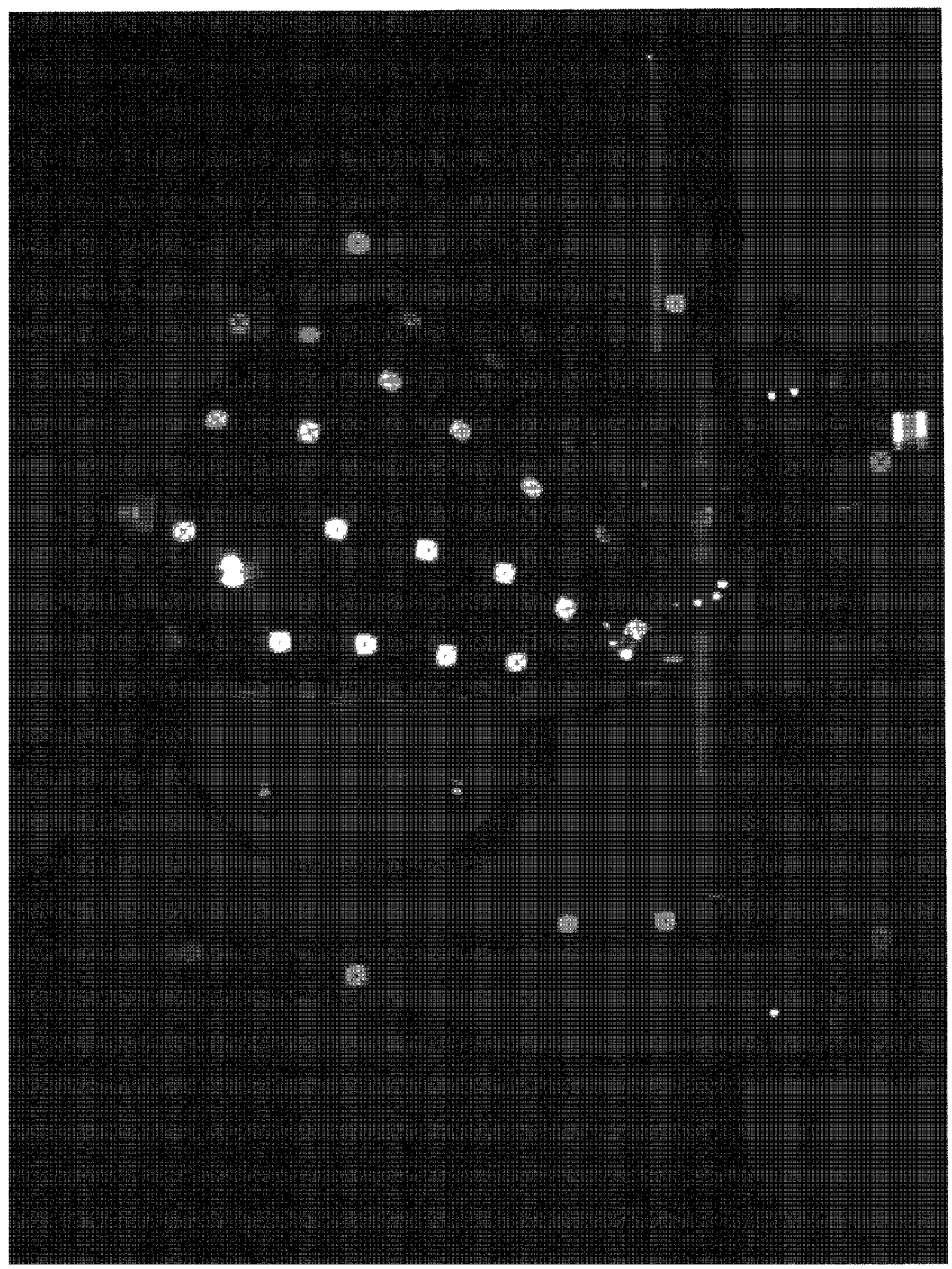
FIG. 10 shows an example of a head image, and is an image obtained by reproducing a head state in an impact by a jig.

The head was fixed to a head fixing jig, and a state of the head near an impact was reproduced. The head was photographed using the measuring apparatus 10. FIG. 10 shows an example of the photographed head image. As for a position of a head camera CM1, a backward distance B1 was set to 8 cm, a height H1 was set to 110 cm, and the Y coordinate (distance S1) was set to −30 cm. The camera position is a camera position when a ball is assumed to be brought into contact with a center of a face of the fixed head. That is, it can be said that the head image of FIG. 10 is an image reproducing the moment (immediately before the ball is crushed and deformed) when the face is brought into contact with the ball in the impact.

The head image was photographed for every set value of a jig face angle and a jig lie angle. That is, 19 head images were photographed in example 1. A measured value was calculated for every head image. All the measured values were obtained from the head image photographed with one camera. Also in examples 2 to 4 to be described later, the same head image as that of the example 1 was used.

As shown in the head image of FIG. 10, a plurality of markers were provided on also the jig or the like around the head. These markers are used for calibration.

The attitude of the head was calculated by the steps St1 to St6 using the head image or the like of FIG. 10. Specifically, a face angle and a lie angle were calculated.

In the head fixing jig, a desired lie angle and face angle can be set. The face angle and the lie angle were set to predetermined values by the head fixing jig, and measurement was performed. A measurement error was verified based on a difference between the measured value obtained by measurement from the head image and an actual set value. The set values of the face angle and the lie angle were changed, and tests were performed at a plurality of levels.

The Newton-Raphson method was used for calculation. Programs enabling the calculation were installed on a hard disk. A CPU executed a process for calculating the three-dimensional coordinates of the markers, and a process for calculating the face angle and the lie angle based on the three-dimensional coordinates in accordance with the programs.

Figure 11:
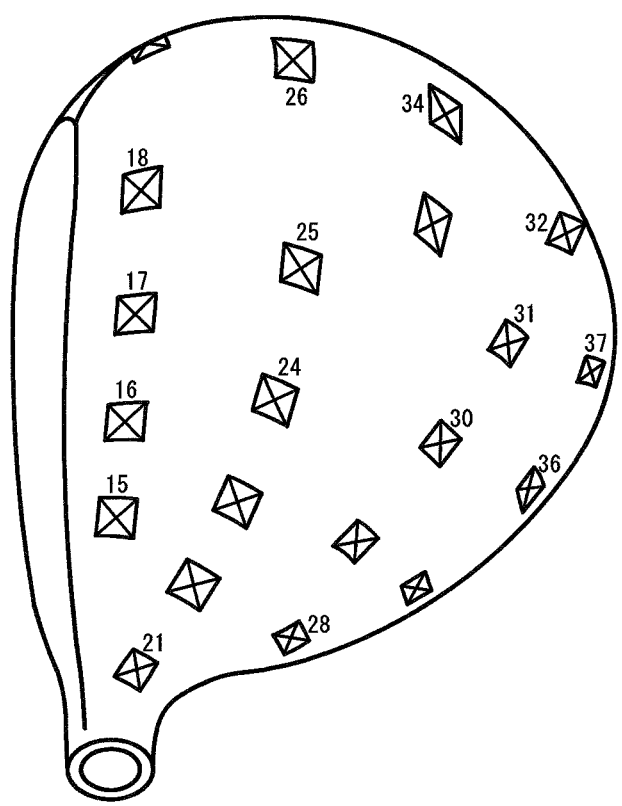
FIG. 11 shows a head (wood type head) used in FIG. 10.

FIG. 11 shows identification numbers of markers applied to the wood type head. In the example 1, four markers of Nos. 15, 18, 28, and 32 were used (see FIG. 11). As shown in Table 9 to be described later, a head vertical width F1 was 60.5 mm, and the number Cn of combinations was 5. In the example 1, Sm/Sh was 0.6 in the head image in a base condition (jig face angle: 0 degree, and jig lie angle: 0 degree). The result of the example 1 is shown in the following Table 1.

In the head fixing jig, the set lie angle and face angle are displayed. The face angle displayed by the head fixing jig is referred to as the jig face angle. Similarly, the lie angle displayed by the head fixing jig is referred to as the jig lie angle. The jig face angle and the actual face angle (absolute face angle) are somewhat different from each other. The jig lie angle and the actual lie angle (absolute lie angle) are somewhat different from each other. These differences are obtained by measuring the base condition in which the set jig lie angle and jig face angle are set to 0 degree. In the example 1, the measured face angle in the base condition was 0.25 degree, and the measured lie angle in the base condition was −3.09 degrees. The measured value was converted into a jig reference value using these values. Also in examples 2 to 4 to be described later, the measured value was converted into the jig reference value using these values.

The absolute face angle calculated based on the measurement was converted into the jig face angle. The converted value was compared with the set value (jig face angle) in the jig. Similarly, the absolute lie angle calculated based on the measurement was converted into the jig lie angle, and the converted value was compared with the set value (jig lie angle) in the jig. That is, the set value and the measured value were adjusted to the jig reference value, and both the values were compared with each other. An absolute value of a difference between the jig reference values is shown in a column of "Deviation between Measured Value and Set Value" in Tables 1 to 8.

Example 2

In example 2, four markers of Nos. 16, 17, 36, and 37 were used (see FIG. 11). A measured value was obtained in the same manner as in the example 1 except for this. As shown in Table 10 to be described later, a head vertical width F1 was 60.5 mm, and the number Cn of combinations was 4. In the example 2, Sm/Sh was 0.3 in a head image in a base condition (jig face angle: 0 degree, and jig lie angle: 0 degree). The result of the example 2 is shown in the following Table 2.

Example 3

In example 3, four markers of Nos. 21, 26, 28, and 34 were used (see FIG. 11). A measured value was obtained in the same manner as in the example 1 except for this. As shown in Table 11 to be described later, a head vertical width F1 was 60.5 mm, and the number Cn of combinations was 4. In the example 3, Sm/Sh was 0.4 in a head image in a base condition (jig face angle: 0 degree, and jig lie angle: 0 degree). The result of the example 3 is shown in the following Table 3.

Example 4

In example 4, four markers of Nos. 24, 25, 30, and 31 were used (see FIG. 11). A measured value was obtained in the same manner as in the example 1 except for this. As shown in Table 12 to be described later, a head vertical width F1 was 60.5 mm, and the number Cn of combinations was 0. In the example 4, Sm/Sh was 0.1 in a head image in a base condition (jig face angle: 0 degree, and jig lie angle: 0 degree). The result of the example 4 is shown in the following Table 4.

[Test by Iron Type Head]

Example 5

An iron type golf club head was prepared. A head of a number 7 iron was used. A plurality of markers were stuck on a crown of the head. Each of the markers had a substantially square shape. White markers were used. Diagonal lines were drawn on each of the markers. An intersection point between the diagonal lines was pointed.

Figure 12:
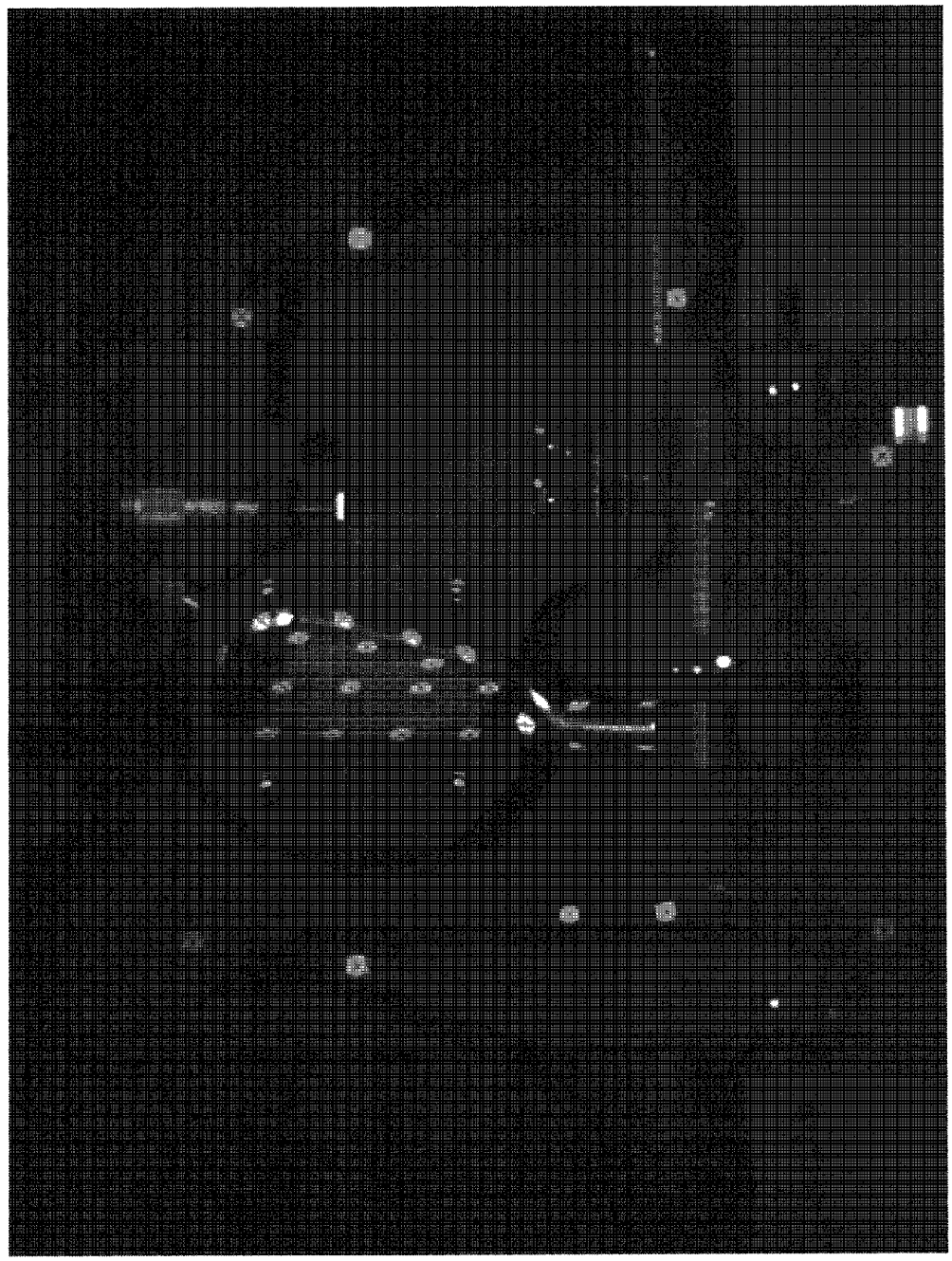
FIG. 12 shows another example of the head image, and is an image obtained by reproducing a head state in an impact by a jig.

The head was fixed to a head fixing jig, and a state of the head near an impact was reproduced. The head was photographed using the measuring apparatus 10. The obtained head image is shown in FIG. 12. As for a position of a camera CM1, a backward distance B1 was set to 8 cm, a height H1 was set to 110 cm, and the Y coordinate (distance S1) was set to −30 cm. The camera position is a camera position when a ball is assumed to be brought into contact with a center of a face of the fixed head.

A face angle and a lie angle were calculated in the same manner as in the example 1 using the head image or the like of FIG. 12.

The head image was photographed for every set value of a jig face angle and a jig lie angle. That is, 19 head images were photographed in example 5. A measured value was calculated for every head image. All the measured values were obtained from the head image photographed with one camera. Also in examples 6 to 8 to be described later, the same head image as that of example 5 was used.

Figure 13:
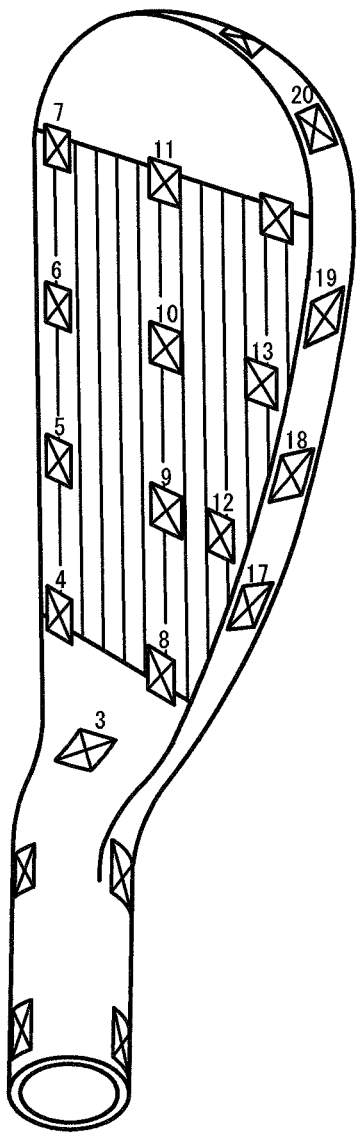
FIG. 13 shows a head (iron type head) used in FIG. 12.

FIG. 13 shows identification numbers of markers applied to the iron type head. In the example 5, four markers of Nos. 4, 7, 17, and 20 were used (see FIG. 13). As shown in Table 13 to be described later, a head vertical width F1 was 48.0 mm, and the number Cn of combinations was 5. In the example 5, Sm/Sh was 0.6 in the head image in a base condition (jig face angle: 0 degree, and jig lie angle: 0 degree). The result of the example 5 is shown in the following Table 5.

In the example 5, the measured face angle in the base condition was 0.30 degree, and the measured lie angle in the base condition was 0.26 degrees. The measured value was converted into a jig reference value using these values. Also in examples 6 to 8 to be described later, the measured value was converted into the jig reference value using these values.

Example 6

In example 6, four markers of Nos. 5, 6, 18, and 19 were used (see FIG. 13). A measured value was obtained in the same manner as in the example 5 except for this. As shown in Table 14 to be described later, a head vertical width F1 was 48.0 mm, and the number Cn of combinations was 2. In the example 6, Sm/Sh was 0.2 in a head image in a base condition (jig face angle: 0 degree, and jig lie angle: 0 degree). The result of the example 6 is shown in the following Table 6.

Example 7

In example 7, four markers of Nos. 3, 8, 11, and 20 were used (see FIG. 13). A measured value was obtained in the same manner as in the example 5 except for this. As shown in Table 15 to be described later, a head vertical width F1 was 48.0 mm, and the number Cn of combinations was 4. In the example 7, Sm/Sh was 0.3 in a head image in a base condition (jig face angle: 0 degree, and jig lie angle: 0 degree). The result of the example 7 is shown in the following Table 7.

Example 8

In example 8, four markers of Nos. 9, 10, 12, and 13 were used (see FIG. 13). A measured value was obtained in the same manner as in the example 5 except for this. As shown in Table 16 to be described later, a head vertical width F1 was 48.0 mm, and the number Cn of combinations was 0. In the example 8, Sm/Sh was 0.07 in a head image in a base condition (jig face angle: 0 degree, and jig lie angle: 0 degree). The result of the example 8 is shown in the following Table 8.

TABLE 1

Specifications and evaluation results of example 1 (W #1)
N = 4 four corners (15, 18, 28, 32)

| Set value | | Measured value | | | | | |
|---|---|---|---|---|---|---|---|
| | | Absolute | | Converted value | | Deviation between measured value and set value (absolute value) | |
| Jig face angle | Jig lie angle | Absolute face angle | Absolute lie angle | Jig face angle | Jig lie angle | Face angle | Lie angle |
| 0 | 0 | 0.25 | −3.09 | | | | |
| 0 | −0.25 | 0.29 | −3.80 | 0.04 | −0.71 | 0.04 | 0.46 |
| 0 | −1 | 0.27 | −4.48 | 0.02 | −1.38 | 0.02 | 0.38 |
| 0 | −5 | 0.13 | −7.48 | −0.13 | −4.39 | 0.13 | 0.61 |
| 0 | 0.25 | 0.24 | −3.78 | −0.02 | −0.69 | 0.02 | 0.94 |
| 0 | 1 | 0.22 | −2.41 | −0.04 | 0.68 | 0.04 | 0.32 |
| 0 | 5 | 0.17 | 0.90 | −0.08 | 3.99 | 0.08 | 1.01 |
| −0.25 | 0 | −0.12 | −3.46 | −0.37 | −0.37 | 0.12 | 0.37 |
| −0.25 | −0.25 | −0.08 | −4.18 | −0.34 | −1.08 | 0.09 | 0.83 |
| −0.25 | −1 | −0.10 | −4.84 | −0.36 | −1.75 | 0.11 | 0.75 |
| −0.25 | −5 | 0.00 | −8.04 | −0.26 | −4.95 | 0.01 | 0.05 |
| −1 | 0 | −0.75 | −3.90 | −1.00 | −0.81 | 0.00 | 0.81 |

TABLE 1-continued

Specifications and evaluation results of example 1 (W #1)
N = 4 four corners (15, 18, 28, 32)

| Set value | | Measured value | | | | Deviation between measured value and set value (absolute value) | |
|---|---|---|---|---|---|---|---|
| | | Absolute | Absolute | Converted value | | | |
| Jig face angle | Jig lie angle | face angle | lie angle | Jig face angle | Jig lie angle | Face angle | Lie angle |
| −1 | −0.25 | −0.72 | −4.23 | −0.97 | −1.13 | 0.03 | 0.88 |
| −1 | −1 | −0.75 | −3.88 | −1.00 | −0.79 | 0.00 | 0.21 |
| −1 | −5 | −0.88 | −8.33 | −1.14 | −5.24 | 0.14 | 0.24 |
| −5 | 0 | −4.91 | −2.64 | −5.17 | 0.45 | 0.17 | 0.45 |
| −5 | −0.25 | −4.87 | −3.37 | −5.12 | −0.28 | 0.12 | 0.03 |
| −5 | −1 | −4.95 | −4.36 | −5.20 | −1.27 | 0.20 | 0.27 |
| −5 | −5 | −5.10 | −9.02 | −5.36 | −5.93 | 0.36 | 0.93 |
| | | | | | average | 0.09 | 0.53 |
| | | | | | max | 0.36 | 1.01 |

TABLE 2

Specifications and evaluation results of example 2 (W #1)
N = 4 horizontally long (16, 17, 36, 37)

| Set value | | Measured value | | | | Deviation between measured value and set value (absolute value) | |
|---|---|---|---|---|---|---|---|
| | | Absolute | Absolute | Converted value | | | |
| Jig face angle | Jig lie angle | face angle | lie angle | Jig face angle | Jig lie angle | Face angle | Lie angle |
| 0 | 0 | 0.25 | −3.09 | | | | |
| 0 | −0.25 | −0.16 | −4.60 | −0.41 | −1.51 | 0.41 | 1.26 |
| 0 | −1 | −0.38 | −5.16 | −0.63 | −2.07 | 0.63 | 1.07 |
| 0 | −5 | 0.24 | −7.96 | −0.01 | −4.87 | 0.01 | 0.13 |
| 0 | 0.25 | −0.75 | −5.32 | −1.00 | −2.23 | 1.00 | 2.48 |
| 0 | 1 | −0.70 | −3.36 | −0.95 | −0.27 | 0.95 | 1.27 |
| 0 | 5 | −0.45 | −0.14 | −0.71 | 2.95 | 0.71 | 2.05 |
| −0.25 | 0 | 0.28 | −3.07 | 0.02 | 0.02 | 0.27 | 0.02 |
| −0.25 | −0.25 | −0.22 | −4.30 | −0.47 | −1.21 | 0.22 | 0.96 |
| −0.25 | −1 | −0.49 | −4.52 | −0.74 | −1.43 | 0.49 | 0.43 |
| −0.25 | −5 | −0.56 | −10.12 | −0.82 | −7.03 | 0.57 | 2.03 |
| −1 | 0 | −1.28 | −4.67 | −1.53 | −1.58 | 0.53 | 1.58 |
| −1 | −0.25 | −0.77 | −3.54 | −1.02 | −0.45 | 0.02 | 0.20 |
| −1 | −1 | −0.85 | −4.63 | −1.10 | −1.54 | 0.10 | 0.54 |
| −1 | −5 | −1.05 | −8.85 | −1.30 | −5.76 | 0.30 | 0.76 |
| −5 | 0 | −5.21 | −2.87 | −5.47 | 0.23 | 0.47 | 0.23 |
| −5 | −0.25 | −5.21 | −2.87 | −5.47 | 0.23 | 0.47 | 0.48 |
| −5 | −1 | −5.64 | −5.33 | −5.89 | −2.24 | 0.89 | 1.24 |
| −5 | −5 | −4.98 | −8.84 | −5.24 | −5.74 | 0.24 | 0.74 |
| | | | | | average | 0.46 | 0.97 |
| | | | | | max | 1.00 | 2.48 |

TABLE 3

Specifications and evaluation results of example 3 (W #1)
N = 4 vertically long (21, 26, 28, 34)

| Set value | | Measured value | | | | Deviation between measured value and set value (absolute value) | |
|---|---|---|---|---|---|---|---|
| | | Absolute | Absolute | Converted value | | | |
| Jig face angle | Jig lie angle | face angle | lie angle | Jig face angle | Jig lie angle | Face angle | Lie angle |
| 0 | 0 | 0.25 | −3.09 | | | | |
| 0 | −0.25 | 0.30 | −5.22 | 0.05 | −2.13 | 0.05 | 1.88 |
| 0 | −1 | 0.38 | −6.43 | 0.13 | −3.33 | 0.13 | 2.33 |

TABLE 3-continued

Specifications and evaluation results of example 3 (W #1)
N = 4 vertically long (21, 26, 28, 34)

| Set value | | Measured value | | Converted value | | Deviation between measured value and set value (absolute value) | |
|---|---|---|---|---|---|---|---|
| Jig face angle | Jig lie angle | Absolute face angle | Absolute lie angle | Jig face angle | Jig lie angle | Face angle | Lie angle |
| 0 | −5 | 0.18 | −9.83 | −0.08 | −6.74 | 0.08 | 1.74 |
| 0 | 0.25 | 0.30 | −5.25 | 0.05 | −2.16 | 0.05 | 2.41 |
| 0 | 1 | 0.40 | −4.30 | 0.15 | −1.21 | 0.15 | 2.21 |
| 0 | 5 | 0.16 | 0.99 | −0.10 | 4.09 | 0.10 | 0.91 |
| −0.25 | 0 | −0.03 | −5.77 | −0.28 | −2.67 | 0.03 | 2.67 |
| −0.25 | −0.25 | 0.14 | −6.35 | −0.11 | −3.25 | 0.14 | 3.00 |
| −0.25 | −1 | 0.11 | −6.74 | −0.14 | −3.65 | 0.11 | 2.65 |
| −0.25 | −5 | 0.03 | −9.48 | −0.22 | −6.39 | 0.03 | 1.39 |
| −1 | 0 | −0.66 | −4.79 | −0.92 | −1.70 | 0.08 | 1.70 |
| −1 | −0.25 | −0.84 | −5.88 | −1.09 | −2.79 | 0.09 | 2.54 |
| −1 | −1 | −0.95 | −4.66 | −1.21 | −1.56 | 0.21 | 0.56 |
| −1 | −5 | −0.84 | −9.98 | −1.09 | −6.89 | 0.09 | 1.89 |
| −5 | 0 | −4.75 | −4.65 | −5.01 | −1.56 | 0.01 | 1.56 |
| −5 | −0.25 | −4.69 | −5.80 | −4.94 | −2.71 | 0.06 | 2.46 |
| −5 | −1 | −4.75 | −5.61 | −5.00 | −2.52 | 0.00 | 1.52 |
| −5 | −5 | −4.97 | −11.14 | −5.22 | −8.05 | 0.22 | 3.05 |
| | | | | | average | 0.09 | 2.03 |
| | | | | | max | 0.22 | 3.05 |

TABLE 4

Specifications and evaluation results of example 4 (W #1)
N = 4 small size (24, 25, 30, 31)

| Set value | | Measured value | | Converted value | | Deviation between measured value and set value (absolute value) | |
|---|---|---|---|---|---|---|---|
| Jig face angle | Jig lie angle | Absolute face angle | Absolute lie angle | Jig face angle | Jig lie angle | Face angle | Lie angle |
| 0 | 0 | 0.25 | −3.09 | | | | |
| 0 | −0.25 | −0.58 | −7.22 | −0.83 | −4.12 | 0.83 | 3.87 |
| 0 | −1 | −0.58 | −7.19 | −0.83 | −4.10 | 0.83 | 3.10 |
| 0 | −5 | −0.03 | −10.15 | −0.28 | −7.06 | 0.28 | 2.06 |
| 0 | 0.25 | −0.33 | −6.48 | −0.58 | −3.39 | 0.58 | 3.64 |
| 0 | 1 | −0.11 | −4.48 | −0.36 | −1.39 | 0.36 | 2.39 |
| 0 | 5 | −0.17 | −0.35 | −0.42 | 2.75 | 0.42 | 2.25 |
| −0.25 | 0 | −0.06 | −4.54 | −0.31 | −1.45 | 0.06 | 1.45 |
| −0.25 | −0.25 | 0.09 | −4.82 | −0.16 | −1.73 | 0.09 | 1.48 |
| −0.25 | −1 | 0.02 | −6.12 | −0.24 | −3.03 | 0.01 | 2.03 |
| −0.25 | −5 | −0.38 | −10.67 | −0.63 | −7.58 | 0.38 | 2.58 |
| −1 | 0 | −1.46 | −6.11 | −1.72 | −3.02 | 0.72 | 3.02 |
| −1 | −0.25 | −1.32 | −6.57 | −1.57 | −3.48 | 0.57 | 3.23 |
| −1 | −1 | −0.89 | −5.05 | −1.14 | −1.96 | 0.14 | 0.96 |
| −1 | −5 | −1.26 | −12.18 | −1.51 | −9.09 | 0.51 | 4.09 |
| −5 | 0 | −4.97 | −4.58 | −5.22 | −1.48 | 0.22 | 1.48 |
| −5 | −0.25 | −5.42 | −6.10 | −5.68 | −3.01 | 0.68 | 2.76 |
| −5 | −1 | −5.42 | −6.08 | −5.68 | −2.99 | 0.68 | 1.99 |
| −5 | −5 | −5.44 | −9.97 | −5.69 | −6.88 | 0.69 | 1.88 |
| | | | | | average | 0.45 | 2.46 |
| | | | | | max | 0.83 | 4.09 |

TABLE 5

Specifications and evaluation results of example 5 (I#7)
N = 4 four corners (4, 7, 17, 20)

| Set value | | Measured value | | Converted value | | Deviation between measured value and set value (absolute value) | |
|---|---|---|---|---|---|---|---|
| Jig face angle | Jig lie angle | Absolute face angle | Absolute lie angle | Jig face angle | Jig lie angle | Face angle | Lie angle |
| 0 | 0 | 0.30 | 0.26 | | | | |
| 0 | −0.25 | 0.09 | −0.13 | −0.21 | −0.40 | 0.21 | 0.15 |
| 0 | −1 | 0.09 | −0.50 | −0.21 | −0.76 | 0.21 | 0.24 |
| 0 | −5 | 0.10 | −4.64 | −0.20 | −4.91 | 0.20 | 0.09 |
| 0 | 0.25 | 0.09 | 0.34 | −0.21 | 0.07 | 0.21 | 0.18 |
| 0 | 1 | 0.09 | 1.47 | −0.21 | 1.21 | 0.21 | 0.21 |
| 0 | 5 | 0.58 | 4.82 | 0.28 | 4.55 | 0.28 | 0.45 |
| −0.25 | 0 | 0.09 | −0.13 | −0.21 | −0.40 | 0.04 | 0.40 |
| −0.25 | −0.25 | 0.09 | −0.13 | −0.21 | −0.40 | 0.04 | 0.15 |
| −0.25 | −1 | 0.09 | −0.96 | −0.21 | −1.22 | 0.04 | 0.22 |
| −0.25 | −5 | −0.22 | −4.35 | −0.52 | −4.61 | 0.27 | 0.39 |
| −1 | 0 | −0.68 | 0.37 | −0.98 | 0.11 | 0.02 | 0.11 |
| −1 | −0.25 | −0.68 | 0.37 | −0.98 | 0.11 | 0.02 | 0.36 |
| −1 | −1 | −0.68 | −0.76 | −0.98 | −1.03 | 0.02 | 0.03 |
| −1 | −5 | −0.67 | −5.41 | −0.97 | −5.67 | 0.03 | 0.67 |
| −5 | 0 | −4.82 | 0.42 | −5.12 | 0.15 | 0.12 | 0.15 |
| −5 | −0.25 | −4.81 | 0.05 | −5.11 | −0.21 | 0.11 | 0.04 |
| −5 | −1 | −4.83 | −0.82 | −5.13 | −1.08 | 0.13 | 0.08 |
| −5 | −5 | −4.85 | −4.95 | −5.15 | −5.21 | 0.15 | 0.21 |
| | | | | | average | 0.13 | 0.23 |
| | | | | | max | 0.28 | 0.67 |

TABLE 6

Specifications and evaluation results of example 6 (I#7)
N = 4 horisontally long (5, 6, 18, 19)

| Set value | | Measured value | | Converted value | | Deviation between measured value and set value (absolute value) | |
|---|---|---|---|---|---|---|---|
| Jig face angle | Jig lie angle | Absolute face angle | Absolute lie angle | Jig face angle | Jig lie angle | Face angle | Lie angle |
| 0 | 0 | 0.30 | 0.26 | | | | |
| 0 | −0.25 | −0.17 | 0.36 | −0.47 | 0.10 | 0.47 | 0.35 |
| 0 | −1 | −0.18 | −0.62 | −0.48 | −0.89 | 0.48 | 0.11 |
| 0 | −5 | −0.16 | −4.61 | −0.46 | −4.87 | 0.46 | 0.13 |
| 0 | 0.25 | −0.18 | 0.57 | −0.48 | 0.31 | 0.48 | 0.06 |
| 0 | 1 | −0.19 | 1.23 | −0.49 | 0.97 | 0.49 | 0.03 |
| 0 | 5 | 0.58 | 4.33 | 0.28 | 4.06 | 0.28 | 0.94 |
| −0.25 | 0 | −0.18 | 0.57 | −0.48 | 0.31 | 0.23 | 0.31 |
| −0.25 | −0.25 | −0.17 | 0.36 | −0.47 | 0.10 | 0.22 | 0.35 |
| −0.25 | −1 | −0.17 | −0.80 | −0.47 | −1.07 | 0.22 | 0.07 |
| −0.25 | −5 | −0.15 | −4.89 | −0.45 | −5.15 | 0.20 | 0.15 |
| −1 | 0 | −0.86 | 0.24 | −1.16 | −0.02 | 0.16 | 0.02 |
| −1 | −0.25 | −0.85 | 0.08 | −1.15 | −0.18 | 0.15 | 0.07 |
| −1 | −1 | −0.85 | −0.90 | −1.15 | −1.16 | 0.15 | 0.16 |
| −1 | −5 | −0.84 | −4.89 | −1.14 | −5.15 | 0.14 | 0.15 |
| −5 | 0 | −5.41 | 1.01 | −5.71 | 0.75 | 0.71 | 0.75 |
| −5 | −0.25 | −5.36 | 0.49 | −5.66 | 0.23 | 0.66 | 0.48 |
| −5 | −1 | −5.39 | −0.15 | −5.68 | −0.42 | 0.68 | 0.58 |
| −5 | −5 | −5.35 | −5.10 | −5.65 | −5.36 | 0.65 | 0.36 |
| | | | | | average | 0.38 | 0.28 |
| | | | | | max | 0.71 | 0.94 |

TABLE 7

Specifications and evaluation results of example 7 (I#7)
N = 4 vertically long (3, 8, 11, 20)

| Set value | | Measured value | | | | Deviation between measured value and set value (absolute value) | |
| --- | --- | --- | --- | --- | --- | --- | --- |
| | | | | Converted value | | | |
| Jig face angle | Jig lie angle | Absolute face angle | Absolute lie angle | Jig face angle | Jig lie angle | Face angle | Lie angle |
| 0 | 0 | 0.30 | 0.26 | | | | |
| 0 | −0.25 | 0.54 | −0.59 | 0.24 | −0.86 | 0.24 | 0.61 |
| 0 | −1 | −0.04 | 1.47 | −0.34 | 1.21 | 0.34 | 2.21 |
| 0 | −5 | −0.30 | −3.74 | −0.60 | −4.01 | 0.60 | 0.99 |
| 0 | 0.25 | −0.03 | 1.30 | −0.33 | 1.04 | 0.33 | 0.79 |
| 0 | 1 | −0.07 | 2.59 | −0.37 | 2.33 | 0.37 | 1.33 |
| 0 | 5 | 0.43 | 5.91 | 0.13 | 5.65 | 0.13 | 0.65 |
| −0.25 | 0 | −0.04 | 1.05 | −0.34 | 0.78 | 0.09 | 0.78 |
| −0.25 | −0.25 | −0.28 | 1.46 | −0.58 | 1.19 | 0.33 | 1.44 |
| −0.25 | −1 | −0.01 | −0.24 | −0.31 | −0.50 | 0.06 | 0.50 |
| −0.25 | −5 | −0.24 | −3.74 | −0.54 | −4.01 | 0.29 | 0.99 |
| −1 | 0 | −0.52 | 1.11 | −0.82 | 0.85 | 0.18 | 0.85 |
| −1 | −0.25 | −0.47 | −0.27 | −0.77 | −0.54 | 0.23 | 0.29 |
| −1 | −1 | −0.49 | −0.16 | −0.79 | −0.43 | 0.21 | 0.57 |
| −1 | −5 | −0.50 | −5.23 | −0.80 | −5.50 | 0.20 | 0.50 |
| −5 | 0 | −4.57 | 0.04 | −4.87 | −0.23 | 0.13 | 0.23 |
| −5 | −0.25 | −4.57 | 0.04 | −4.87 | −0.23 | 0.13 | 0.02 |
| −5 | −1 | −4.55 | −1.17 | −4.85 | −1.44 | 0.15 | 0.44 |
| −5 | −5 | −4.53 | −4.86 | −4.83 | −5.12 | 0.17 | 0.12 |
| | | | | | average | 0.23 | 0.74 |
| | | | | | max | 0.60 | 2.21 |

TABLE 8

Specifications and evaluation results of example 8 (I#7)
N = 4 small size (9, 10, 12, 13)

| Set value | | Measured value | | | | Deviation between measured value and set value (absolute value) | |
| --- | --- | --- | --- | --- | --- | --- | --- |
| | | | | Converted value | | | |
| Jig face angle | Jig lie angle | Absolute face angle | Absolute lie angle | Jig face angle | Jig lie angle | Face angle | Lie angle |
| 0 | 0 | 0.30 | 0.26 | | | | |
| 0 | −0.25 | −0.24 | −0.49 | −0.54 | −0.75 | 0.54 | 0.50 |
| 0 | −1 | −0.24 | −0.49 | −0.54 | −0.75 | 0.54 | 0.25 |
| 0 | −5 | −0.22 | −4.35 | −0.52 | −4.61 | 0.52 | 0.39 |
| 0 | 0.25 | −0.24 | −0.49 | −0.54 | −0.75 | 0.54 | 1.00 |
| 0 | 1 | −0.78 | 1.46 | −1.08 | 1.20 | 1.08 | 0.20 |
| 0 | 5 | −0.27 | 5.00 | −0.56 | 4.74 | 0.56 | 0.26 |
| −0.25 | 0 | −0.77 | −0.38 | −1.07 | −0.65 | 0.82 | 0.65 |
| −0.25 | −0.25 | −0.78 | −0.81 | −1.07 | −1.07 | 0.82 | 0.82 |
| −0.25 | −1 | −0.23 | −1.96 | −0.53 | −2.23 | 0.28 | 1.23 |
| −0.25 | −5 | −0.22 | −4.35 | −0.52 | −4.61 | 0.27 | 0.39 |
| −1 | 0 | −0.77 | −0.38 | −1.07 | −0.65 | 0.07 | 0.65 |
| −1 | −0.25 | −0.76 | −2.31 | −1.06 | −2.57 | 0.06 | 2.32 |
| −1 | −1 | −0.76 | −2.31 | −1.06 | −2.57 | 0.06 | 1.57 |
| −1 | −5 | −0.74 | −6.15 | −1.04 | −6.42 | 0.04 | 1.42 |
| −5 | 0 | −4.81 | −1.14 | −5.11 | −1.40 | 0.11 | 1.40 |
| −5 | −0.25 | −4.85 | −0.13 | −5.15 | −0.39 | 0.15 | 0.14 |
| −5 | −1 | −4.92 | −0.52 | −5.22 | −0.78 | 0.22 | 0.22 |
| −5 | −5 | −4.73 | −4.44 | −5.03 | −4.71 | 0.03 | 0.29 |
| | | | | | average | 0.37 | 0.76 |
| | | | | | max | 1.08 | 2.32 |

Table 9 shows all marker intervals in the example 1. Table 10 shows all marker intervals in the example 2. Table 11 shows all marker intervals in the example 3. Table 12 shows all marker intervals in the example 4. Table 13 shows all marker intervals in the example 5. Table 14 shows all marker intervals in the example 6. Table 15 shows all marker intervals in the example 7. Table 16 shows all marker intervals in the example 8.

TABLE 9

Marker interval of example 1
Head vertical width F1 = 60.5 mm

| Combination of markers | Marker interval (mm) |
|---|---|
| 15 ⇔ 18 | 60.8 |
| 15 ⇔ 28 | 43.2 |
| 15 ⇔ 32 | 97.1 |
| 18 ⇔ 28 | 91.7 |
| 18 ⇔ 32 | 80.1 |
| 28 ⇔ 32 | 90.0 |

Number of combinations of head vertical width or greater, Cn = 5

TABLE 10

Marker interval of example 2
Head vertical width F1 = 60.5 mm

| Combination of markers | Marker interval (mm) |
|---|---|
| 16 ⇔ 17 | 20.7 |
| 16 ⇔ 36 | 81.9 |
| 16 ⇔ 37 | 88.7 |
| 17 ⇔ 36 | 87.0 |
| 17 ⇔ 37 | 87.8 |
| 36 ⇔ 37 | 25.2 |

Number of combinations of head vertical width or greater, Cn = 4

TABLE 11

Marker interval of example 3
Head vertical width F1 = 60.5 mm

| Combination of markers | Marker interval (mm) |
|---|---|
| 21 ⇔ 26 | 117.2 |
| 21 ⇔ 28 | 25.8 |
| 21 ⇔ 34 | 118.1 |
| 26 ⇔ 28 | 109.1 |
| 26 ⇔ 34 | 30.0 |
| 28 ⇔ 34 | 103.9 |

Number of combinations of head vertical width or greater, Cn = 4

TABLE 12

Marker interval of example 4
Head vertical width F1 = 60.5 mm

| Combination of markers | Marker interval (mm) |
|---|---|
| 24 ⇔ 25 | 23.3 |
| 24 ⇔ 30 | 33.7 |
| 24 ⇔ 31 | 45.3 |
| 25 ⇔ 30 | 43.3 |
| 25 ⇔ 31 | 43.0 |
| 30 ⇔ 31 | 22.2 |

Number of combinations of head vertical width or greater, Cn = 0

TABLE 13

Marker interval of example 5
Head vertical width F1 = 48.0 mm

| Combination of markers | Marker interval (mm) |
|---|---|
| 4 ⇔ 7 | 54.0 |
| 4 ⇔ 17 | 36.3 |
| 4 ⇔ 20 | 80.2 |
| 7 ⇔ 17 | 57.4 |
| 7 ⇔ 20 | 48.3 |
| 17 ⇔ 20 | 57.5 |

Number of combinations of head vertical width or greater, Cn = 5

TABLE 14

Marker interval of example 6
Head vertical width F1 = 48.0 mm

| Combination of markers | Marker interval (mm) |
|---|---|
| 5 ⇔ 6 | 18.5 |
| 5 ⇔ 18 | 43.0 |
| 5 ⇔ 19 | 55.7 |
| 6 ⇔ 18 | 44.1 |
| 6 ⇔ 19 | 49.9 |
| 18 ⇔ 19 | 20.3 |

Number of combinations of head vertical width or greater, Cn = 2

TABLE 15

Marker interval of example 7
Head vertical width F1 = 48.0 mm

| Combination of markers | Marker interval (mm) |
|---|---|
| 3 ⇔ 8 | 13.8 |
| 3 ⇔ 11 | 64.9 |
| 3 ⇔ 20 | 82.1 |
| 8 ⇔ 11 | 54.1 |
| 8 ⇔ 20 | 69.6 |
| 11 ⇔ 20 | 27.8 |

Number of combinations of head vertical width or greater, Cn = 4

TABLE 16

Marker interval of example 8
Head vertical width F1 = 48.0 mm

| Combination of markers | Marker interval (mm) |
|---|---|
| 9 ⇔ 10 | 18.4 |
| 9 ⇔ 12 | 10.8 |
| 9 ⇔ 13 | 25.8 |
| 10 ⇔ 12 | 21.6 |
| 10 ⇔ 13 | 18.4 |
| 12 ⇔ 13 | 19.9 |

Number of combinations of head vertical width or greater, Cn = 0

The average value (average) and the maximum value (max) of the deviation between the measured value and the set value are shown in Tables 1 to 8. It can be said that the measurement error is smaller when these values are smaller. The measurement error tends to be suppressed when the number Cn of combinations is greater.

Advantages of the present invention are apparent from the evaluation results of Tables 1 to 8.

The method described above can be applied to the detection of the attitude and/or position of the head.

The description hereinabove is merely for an illustrative example, and various modifications can be made in the scope not to depart from the principles of the present invention.

What is claimed is:

1. A head measuring method comprising the steps of:
   (a) preparing a golf club head with a plurality of markers provided thereon;
   (b) photographing the head by a camera disposed at a position, wherein a backward distance between the position and a center point of a ball is equal to or greater than 0, to obtain a head image near an impact; and
   (c) analyzing the head image to calculate a position and attitude of the head near the impact,
   wherein the position and attitude of the head near the impact are calculated by analyzing the head image of a single camera in the step (c).

2. The head measuring method according to claim 1, wherein when a three-dimensional distance between the markers is defined as a marker interval, three or more combinations of the markers set such that the marker interval is equal to or greater than a height of the head.

3. The head measuring method according to claim 1, wherein the plurality of markers is disposed outside a face surface.

4. The head measuring method according to claim 1, wherein the number N of the markers is 3 or greater and 20 or less.

5. A head measuring method comprising the steps of:
   (a) preparing a golf club head with plurality of markers provided thereon;
   (b) photographing the head by a camera disposed at a position, wherein a backward distance between the position and a center point of a ball is equal to or greater than 0, to obtain a head image near an impact; and
   (c) analyzing the head image to calculate a position and attitude of the head near the impact,
   wherein when an area of a marker forming region defined by connecting the plurality of markers by a straight line in the head image is defined as Sm, and an area of a whole region of the head defined by a contour line of the head in the head image is defined as Sh, Sm/Sh is equal to or greater than 0.25.

6. The head measuring method according to claim 5, wherein when a three-dimensional distance between the markers is defined as a marker interval, three or more combinations of the markers set such that the marker interval is equal to or greater than a height of the head.

7. The head measuring method according to claim 5, wherein the number N of the markers is 3 or greater and 20 or less.

8. The head measuring method according to claim 5, wherein when a centroid Gh of a contour line of the head is determined in the head image, and the head image is partitioned into four by a straight line L1 and a straight line L2 orthogonal to each other with the centroid Gh as an intersection point, at least one of the markers is disposed in each of the two partitions placed at diagonal positions, of the four partitions.

9. The head measuring method according to claim 5, wherein the position and attitude of the head near the impact are calculated by analyzing the head image of a single camera in the step (c).

10. The head measuring method according to claim 5, wherein the plurality of markers is disposed outside a face surface.

11. A head measuring method comprising the steps of:
    (a) preparing a golf club a head with plurality of markers provided thereon;
    (b) photographing the head by a camera disposed at a position, wherein a backward distance between the position and a center point of a ball is equal to or greater than 0, to obtain a head image near an impact; and
    (c) analyzing the head image to calculate a position and attitude of the head near the impact,
    wherein when a centroid Gh of a contour line of the head is determined in the head image, and the head image is partitioned into four by a straight line L1 and a straight line L2 orthogonal to each other with the centroid Gh as an intersection point, at least one of the markers is disposed in each of the two partitions placed at diagonal positions, of the four partitions.

12. The head measuring method according to claim 11, wherein when a three-dimensional distance between the markers is defined as a marker interval, three or more combinations of the markers set such that the marker interval is equal to or greater than a height of the head.

13. The head measuring method according to claim 11, wherein the number N of the markers is 3 or greater and 20 or less.

14. The head measuring method according to claim 11, wherein the position and attitude of the head near the impact are calculated by analyzing the head image of a single camera in the step (c).

15. The head measuring method according to claim 11, wherein the plurality of markers is disposed outside a face surface.

* * * * *